(12) United States Patent
Imaizumi et al.

(10) Patent No.: US 11,657,688 B2
(45) Date of Patent: May 23, 2023

(54) WORK VEHICLE PERIPHERY MONITORING SYSTEM AND WORK VEHICLE PERIPHERY MONITORING METHOD

(71) Applicant: Komatsu Ltd., Tokyo (JP)

(72) Inventors: Masaaki Imaizumi, Tokyo (JP); Masataka Ozaki, Tokyo (JP); Takeshi Kurihara, Tokyo (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 17/851,091

(22) Filed: Jun. 28, 2022

(65) Prior Publication Data

US 2022/0327900 A1 Oct. 13, 2022

Related U.S. Application Data

(62) Division of application No. 17/271,338, filed as application No. PCT/JP2019/027665 on Jul. 12, 2019.

(30) Foreign Application Priority Data

Sep. 28, 2018 (JP) ................................. 2018-186037

(51) Int. Cl.
*G08B 13/196* (2006.01)
*B60Q 9/00* (2006.01)
(Continued)

(52) U.S. Cl.
CPC ............ *G08B 13/196* (2013.01); *B60Q 9/008* (2013.01); *E02F 9/261* (2013.01); *G06V 20/56* (2022.01); *E02F 3/3417* (2013.01)

(58) Field of Classification Search
CPC ...... G08B 13/196; G06B 13/18; G08G 1/166; B60Q 9/008; E02F 9/261; E02F 3/341;
(Continued)

(56) References Cited

U.S. PATENT DOCUMENTS 9,541,922 B2 * 1/2017 Tsujimoto ............ G05D 1/0223
9,597,997 B2 3/2017 Mitsuta et al.
(Continued)

FOREIGN PATENT DOCUMENTS

CN 103098112 A 5/2013
CN 105474635 A 4/2016
(Continued)

OTHER PUBLICATIONS

International Search Report dated Aug. 6, 2019, issued for PCT/JP2019/027665.
(Continued)

*Primary Examiner* — Ojiako K Nwugo
(74) *Attorney, Agent, or Firm* — Locke Lord LLP

(57) ABSTRACT

A work vehicle periphery monitoring system includes: an alarm range storage unit that stores an alarm range, in which an alarm output is required when an object is present, in a detection range of an object detection device that detects an object present in a periphery of a work vehicle; a work mode determination unit that determines a work mode of the work vehicle; an alarm range changing unit that changes the alarm range in the detection range when it is determined that the work mode is a specific work mode; and an alarm control unit that causes an alarm device to output an alarm when an object is present in the alarm range.

3 Claims, 12 Drawing Sheets

(51) Int. Cl.
*E02F 9/26* (2006.01)
*G06V 20/56* (2022.01)
*E02F 3/34* (2006.01)

(58) Field of Classification Search
CPC ......... E02F 9/262; E02F 9/24; E02F 9/08417; G10S 2013/9323; G01S 2013/9393; G01S 2013/9317; G01S 2013/93272; G01S 2013/867; G01S 2013/87; G01S 2013/931; G01S 2015/86; G01S 2015/87; G01S 2015/931; G01S 2017/87; G01S 2017/931; G06V 20/56; G06V 20/58; H04N 7/181; H04N 7/18
See application file for complete search history.

(56) References Cited

U.S. PATENT DOCUMENTS

| | | | | |
|---|---|---|---|---|
| 11,052,909 | B1* | 7/2021 | Kulkarni | G05D 1/0214 |
| 11,221,630 | B2* | 1/2022 | Nishi | G08G 1/00 |
| 2013/0141581 | A1 | 6/2013 | Mitsuta et al. | |
| 2014/0347483 | A1* | 11/2014 | Nakanishi | G08G 1/165 348/148 |
| 2015/0210213 | A1* | 7/2015 | Mitsuta | G01S 13/867 340/435 |
| 2016/0006947 | A1 | 1/2016 | Kowatari et al. | |
| 2016/0062357 | A1* | 3/2016 | Masaki | B25J 9/1694 901/1 |
| 2016/0200252 | A1 | 7/2016 | Oota et al. | |
| 2016/0202351 | A1 | 7/2016 | Uotsu | |
| 2016/0236616 | A1* | 8/2016 | Kurihara | B60R 1/00 |
| 2017/0210386 | A1* | 7/2017 | Kou | B60W 30/02 |
| 2017/0357270 | A1* | 12/2017 | Russell | G05D 1/0094 |
| 2018/0080198 | A1 | 3/2018 | Machida et al. | |
| 2018/0284758 | A1* | 10/2018 | Cella | G16Z 99/00 |
| 2018/0370432 | A1 | 12/2018 | Imaizumi et al. | |
| 2019/0025813 | A1* | 1/2019 | Cella | G06N 5/046 |
| 2020/0277757 | A1* | 9/2020 | Kurokami | E02F 9/24 |
| 2021/0309161 | A1* | 10/2021 | Maeda | B60D 1/58 |

FOREIGN PATENT DOCUMENTS

| | | |
|---|---|---|
| CN | 105531996 A | 4/2016 |
| CN | 107407078 A | 11/2017 |
| JP | 2009-139240 A | 6/2009 |
| JP | 2011-230731 A | 11/2011 |
| JP | 2012-256113 A | 12/2012 |
| WO | 2018/042567 A1 | 3/2018 |
| WO | 2018/146782 A1 | 8/2018 |

OTHER PUBLICATIONS

Supplementary European Search Report dated Mar. 24, 2022, issued in the corresponding EP patent application No. 19865722.3.
Office Action dated Apr. 25, 2022, issued for Chinese Patent Application No. 201980056422.1 and English translation thereof.

* cited by examiner

FIG.5
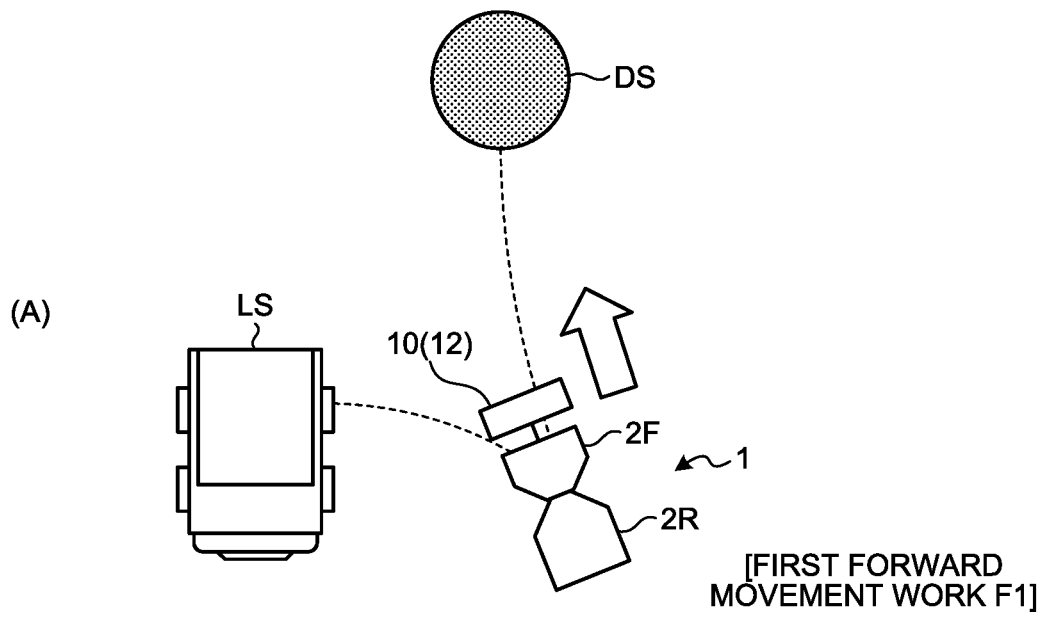
[FIRST FORWARD MOVEMENT WORK F1]
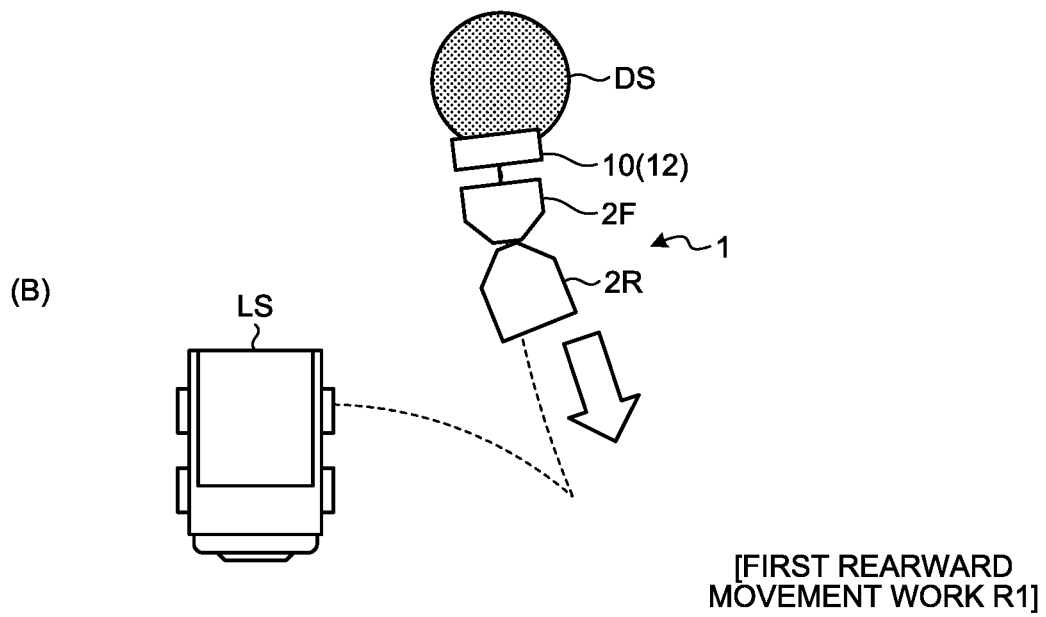
[FIRST REARWARD MOVEMENT WORK R1]

FIG.6
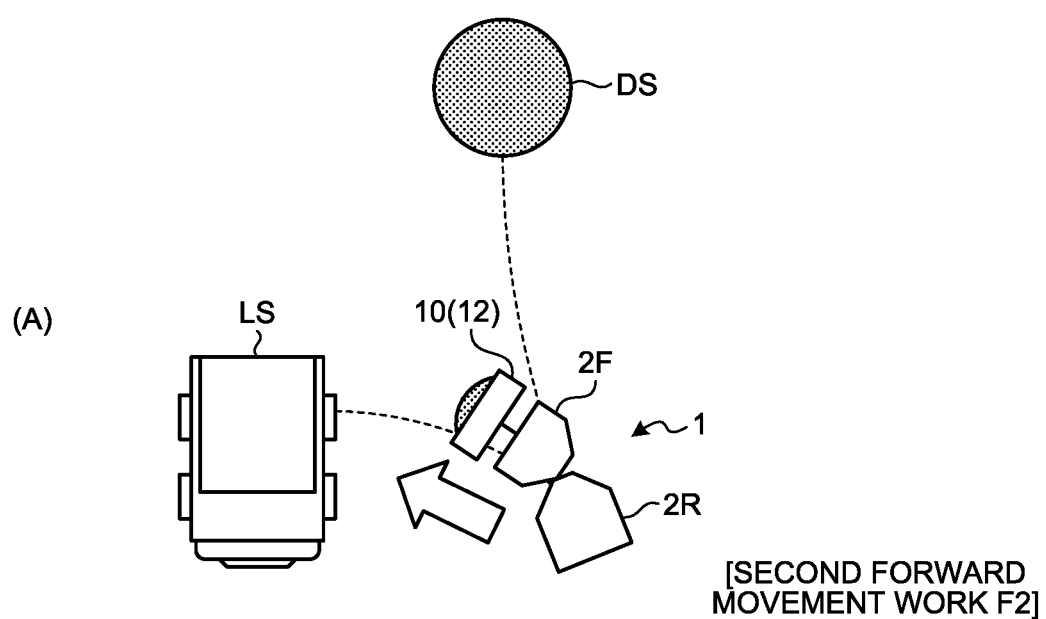
(A) [SECOND FORWARD MOVEMENT WORK F2]
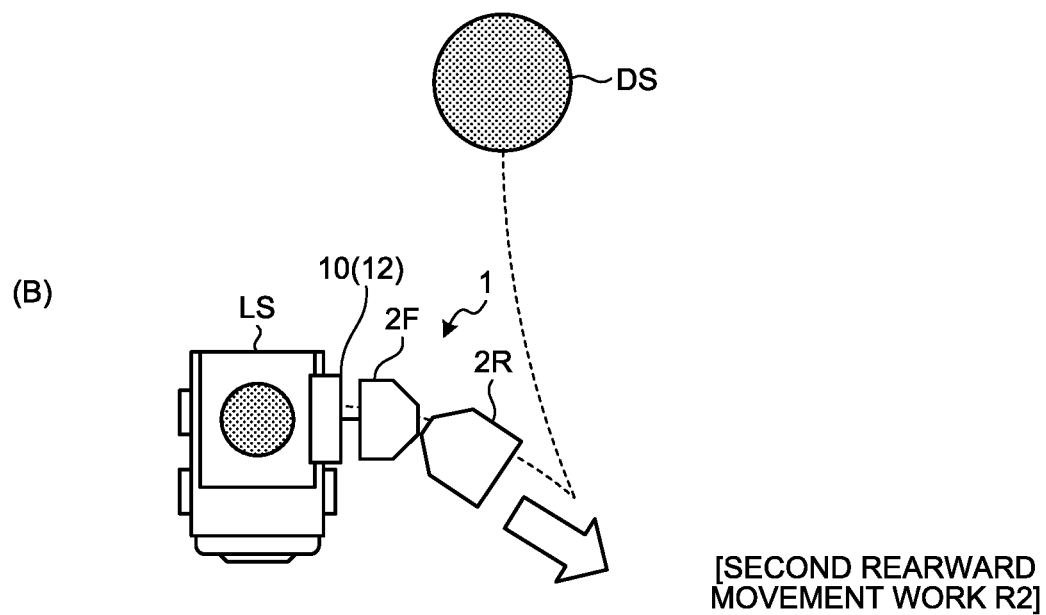
(B) [SECOND REARWARD MOVEMENT WORK R2]

[FIRST REARWARD MOVEMENT WORK R1]

[FIRST REARWARD MOVEMENT WORK R1]

[FIRST REARWARD MOVEMENT WORK R1]

[FIRST REARWARD MOVEMENT WORK R1]

WORK VEHICLE PERIPHERY MONITORING SYSTEM AND WORK VEHICLE PERIPHERY MONITORING METHOD

FIELD

The present invention relates to a work vehicle periphery monitoring system and a work vehicle periphery monitoring method.

BACKGROUND

In the technical field related to a work vehicle, a periphery monitoring system that monitors a situation in the periphery of the work vehicle by using an object detection device has been known. Patent Literature 1 discloses a technology for monitoring the periphery of a work vehicle using a radar device which is a kind of object detection device.

CITATION LIST

Patent Literature

Patent Literature 1: JP 2012-256113 A

SUMMARY

Technical Problem

When the object detection device detects an object present in the periphery of the work vehicle, an alarm is output from an alarm device provided in a driver's cab of the work vehicle. In a case where the object is an obstacle that interferes with a work of the work vehicle, the alarm is output, such that the driver of the work vehicle can recognize that the obstacle is present in the periphery of the work vehicle. On the other hand, in a case where the object that is present in the periphery of the work vehicle is an object necessary for the work of the work vehicle, when the object detection device detects the object as an obstacle, an unnecessary alarm is output from the alarm device even though the driver is fully aware of the situation in the periphery of the work vehicle, and as a result, the driver may feel troublesome. Patent Literature 1 discloses switching between activation and deactivation of a sensor having a predetermined detection range according to the position (F, N, or R) of a shift lever. However, an alarm region is not set within the detection range, and the alarm region cannot be changed according to the working state, and thus it is not possible to sufficiently suppress the output of unnecessary alarms.

An aspect of the present invention is to suppress the output of unnecessary alarms and to output necessary alarms.

Solution to Problem

According to an aspect of the present invention, a work vehicle periphery monitoring system comprises: an alarm range storage unit that stores an alarm range, in which an alarm output is required when an object is present, in a detection range of an object detection device that detects an object present in a periphery of a work vehicle; a work mode determination unit that determines a work mode of the work vehicle; an alarm range changing unit that changes the alarm range in the detection range when it is determined that the work mode is a specific work mode; and an alarm control unit that causes an alarm device to output an alarm when an object is present in the alarm range.

Advantageous Effects of Invention

According to an aspect of the present invention, it is possible to suppress the output of unnecessary alarms and to output necessary alarms.

BRIEF DESCRIPTION OF DRAWINGS

FIG. 5 is a diagram schematically illustrating a work of a work vehicle in a specific work mode.
FIG. 6 is a diagram schematically illustrating the work of a work vehicle in a specific work mode.

DESCRIPTION OF EMBODIMENTS

Hereinafter, embodiments according to the present invention will be described with reference to the drawings, but the present invention is not limited thereto. Components of the embodiments to be described below can be combined as appropriate. In addition, some components are not used in some cases.

[Work Vehicle]

Figure 1:
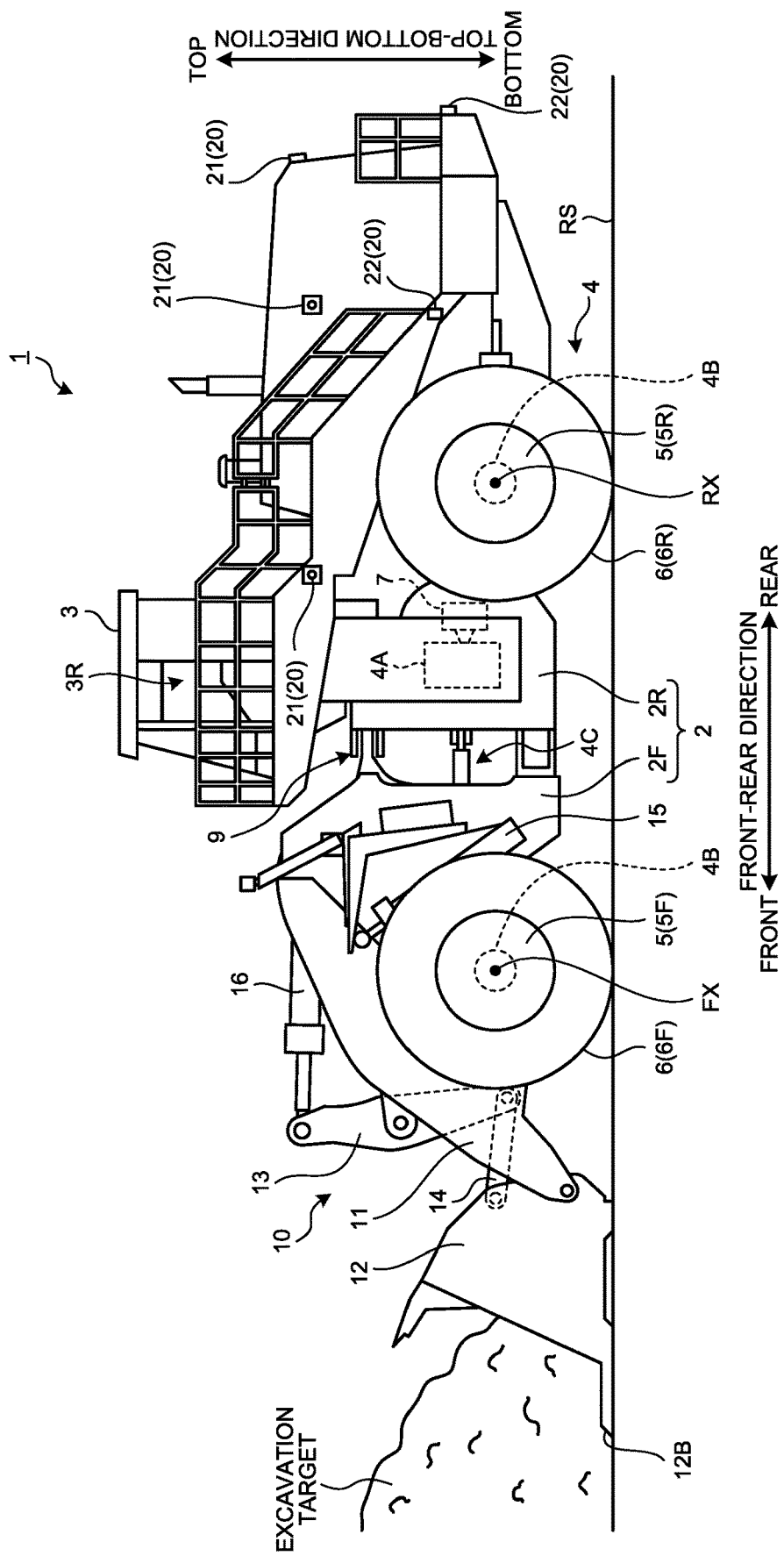
FIG. 1 is a side view illustrating a work vehicle.

FIG. 1 is a side view illustrating a work vehicle 1. The work vehicle 1 performs a predetermined work on a work target at a work site. The work vehicle 1 includes working equipment 10, and performs a predetermined work by using the working equipment 10. The predetermined work includes at least one of an excavation work or a loading work. The work target includes at least one of an excavation target or a loading target. The work target is an object necessary for the predetermined work of the work vehicle 1. The work vehicle 1 performs the excavation work in which the excavation target is excavated and the loading work in which an excavated object excavated by the excavation work is loaded into the loading target. The loading work includes a discharge work in which the excavated object is discharged to a discharge target. As the excavation target, at least one of a heap of earth, a heap of rocks, coal, or a wall is exemplified. The heap of earth is a heap of earth and sand. The heap of rocks is a heap of rocks or stones. At least one of a transport vehicle, a predetermined area of the work site, a hopper, a belt conveyor, or a crusher is exemplified as the loading target or the discharge target.

In an embodiment, the work vehicle 1 is a wheel loader 1 which is a kind of articulated work vehicle. The wheel loader 1 is driven by a driver. The wheel loader 1 includes a driver's stand 3 including a driver's cab 3R on which the driver boards, and wheels 5 on which tires 6 are mounted.

In the following description, the positional relationship of the respective parts will be described using the terms such as a top-bottom direction, a vehicle width direction, and a front-rear direction. The top-bottom direction refers to a direction orthogonal to a ground contact surface of the tire 6 that comes into contact with a ground surface RS. The vehicle width direction refers to a direction parallel to a rotation axis of the wheel 5. The front-rear direction refers to a direction orthogonal to the top-bottom direction and the vehicle width direction.

The term "top" refers to one direction in the top-bottom direction, and means a direction in which the driver's cab 3R is present based on the ground contact surface of the tire 6. The term "bottom" refers to a direction opposite to "top" in the top-bottom direction. The term "left" refers to one direction in the vehicle width direction. The term "right" refers to a direction opposite to "left" in the vehicle width direction. The term "front" refers to one direction in the front-rear direction, and refers to a direction in which the working equipment 10 is present based on the driver's cab 3R. The term "rear" refers to a direction opposite to "front" in the front-rear direction.

As illustrated in FIG. 1, the wheel loader 1 includes a vehicle body 2, the driver's stand 3, a traveling device 4, a transmission 7, the working equipment 10, a boom cylinder 15, and a bucket cylinder 16.

The vehicle body 2 includes a vehicle body front part 2F and a vehicle body rear part 2R arranged behind the vehicle body front part 2F. The vehicle body front part 2F and the vehicle body rear part 2R are connected in a bendable manner via a joint mechanism 9.

The driver's stand 3 is supported by the vehicle body 2. The driver's cab 3R is provided in the driver's stand 3. The wheel loader 1 is driven by the driver who boards on the driver's cab 3R.

The traveling device 4 supports the vehicle body 2 and travels on the ground surface RS. The traveling device 4 includes the wheels 5, an engine 4A, a brake 4B, and a steering cylinder 4C. The tire 6 is mounted on the wheel 5.

The wheels 5 include two front wheels 5F rotatably supported by the vehicle body front part 2F and two rear wheels 5R rotatably supported by the vehicle body rear part 2R. The tires 6 include front tires 6F mounted on the front wheels 5F and rear tires 6R mounted on the rear wheels 5R.

The vehicle width direction of the vehicle body 2 includes the vehicle width direction of the vehicle body front part 2F that is parallel to a rotation axis FX of the front wheel 5F and the vehicle width direction of the vehicle body rear part 2R that is parallel to a rotation axis RX of the rear wheel 5R. When the wheel loader 1 travels straight ahead, the rotation axis FX and the rotation axis RX are parallel to each other, and the vehicle width direction of the vehicle body front part 2F and the vehicle width direction of the vehicle body rear part 2R are the same as each other.

The steering cylinder 4C is a hydraulic cylinder that generates power to swing the wheel loader 1. The steering cylinder 4C is provided in the joint mechanism 9. As the steering cylinder 4C extends and retracts, the vehicle body front part 2F is bent with respect to the vehicle body rear part 2R. As the vehicle body front part 2F is bent with respect to the vehicle body rear part 2R, the wheel loader 1 swings and a traveling direction of the wheel loader 1 is adjusted.

The transmission 7 has a plurality of gear stages. In an embodiment, the transmission 7 has four gear stages. That is, the transmission 7 has first, second, third, and fourth gear stages. As the gear stage of the transmission 7 is changed, a gear ratio indicating a ratio between the rotation speed of an input shaft and the rotation speed of an output shaft of the transmission 7 is changed. Further, the transmission 7 switches a rotation direction of the output shaft with respect to a rotation direction of the input shaft. As the rotation direction of the output shaft of the transmission 7 is switched, the wheel loader 1 moves forward or rearward.

The working equipment 10 is supported by the vehicle body front part 2F. At least a part of the working equipment 10 is arranged in front of the vehicle body front part 2F. The working equipment 10 includes a boom 11, a bucket 12, a bell crank 13, and a link 14.

The boom 11 is rotatably connected to the vehicle body front part 2F. The bell crank 13 is connected to the bucket 12 via the link 14. The bucket 12 is rotatably connected to a distal end portion of the boom 11. The bucket 12 is a working member having a distal end portion 12B with a blade. The bucket 12 is arranged in front of the front tire 6F.

The boom cylinder 15 is a hydraulic cylinder that generates power to operate the boom 11. As the boom cylinder 15 extends and retracts, the boom 11 makes upward movement or downward movement.

The bucket cylinder 16 is a hydraulic cylinder that generates power to operate the bucket 12. As the bucket cylinder 16 extends and retracts, the bucket 12 makes dumping movement or tilting movement. As the bucket 12 makes the tilting movement, the bucket 12 scoops the excavated object. As the bucket 12 makes the dumping movement, the excavated object held in the bucket 12 is discharged from the bucket 12.

[Object Detection Device]

The wheel loader 1 includes a periphery monitoring system 100 that monitors the periphery of the wheel loader 1 and makes the driver recognize a situation in the periphery of the wheel loader 1. The periphery monitoring system 100 includes an object detection device 20.

Figure 2:
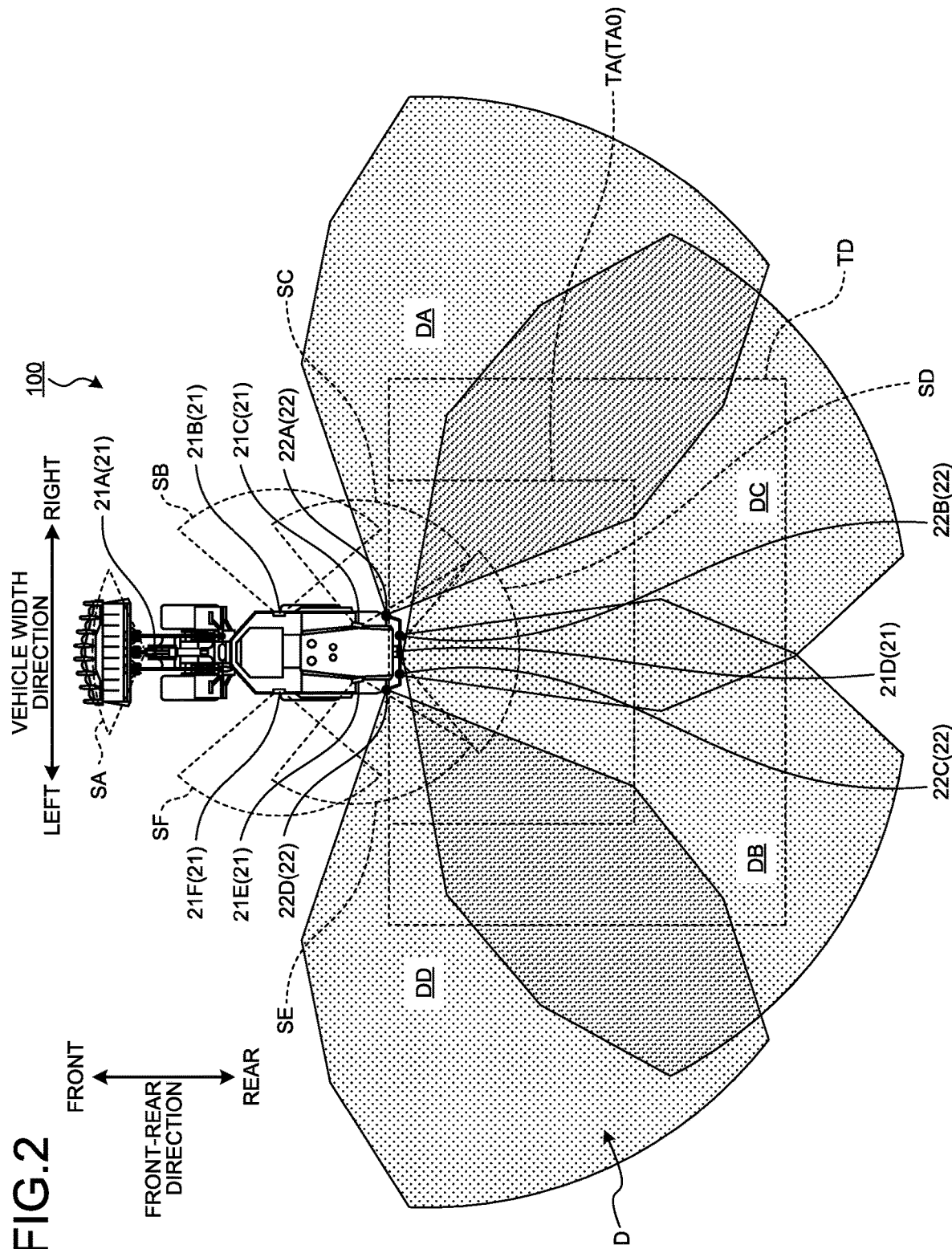
FIG. 2 is a diagram schematically illustrating a shooting region and a detection region of an object detection device.

FIG. 2 is a diagram schematically illustrating a shooting region and a detection region of the object detection device 20. The object detection device 20 detects an object present in the periphery of the wheel loader 1. As illustrated in FIGS. 1 and 2, the object detection device 20 includes a camera 21 that shoots an object present in the periphery of the wheel loader 1 and a non-contact sensor 22 that detects the object present in the periphery of the wheel loader 1 in a non-contact manner.

A plurality of cameras 21 are mounted on the wheel loader 1 and acquire images of the object present in the periphery of the wheel loader 1. The cameras 21 are provided on an outer surface of the vehicle body 2 of the wheel loader 1. The cameras 21 include a camera 21A provided in the vehicle body front part 2F, and a camera 21B, a camera 21C, a camera 21D, a camera 21E, and a camera 21F provided in the vehicle body rear part 2R. An imaging region of each camera 21 may partially overlap with an imaging region of an adjacent camera 21.

The camera 21A is provided on the outer surface on the front side of the vehicle body front part 2F, and shoots a shooting region SA defined in front of the vehicle body 2.

The camera 21B is provided at a front part of the outer surface on the right side of the vehicle body rear part 2R, and shoots a shooting region SB defined on the right side of the vehicle body 2.

The camera 21C is provided at a rear part of the outer surface on the right side of the vehicle body rear part 2R, and shoots a shooting region SC defined on the right side and the rear-right side of the vehicle body 2.

The camera 21D is provided on the outer surface on the rear side of the vehicle body rear part 2R, and shoots a shooting region SD defined behind the vehicle body 2.

The camera 21E is provided at a rear part of the outer surface on the left side of the vehicle body rear part 2R, and shoots a shooting region SE defined on the left side and the rear-left side of the vehicle body 2.

The camera 21F is provided at a front part of the outer surface on the left side of the vehicle body rear part 2R, and shoots a shooting region SF defined on the left side of the vehicle body 2.

A plurality of non-contact sensors 22 are mounted on the wheel loader 1 and detect an object present in the periphery of the wheel loader 1 in a non-contact manner. The non-contact sensors 22 scan the periphery of the wheel loader 1 to detect an object. Detection data of the non-contact sensor 22 includes presence/absence data of the object and position data of the object. The position data of the object indicates relative positions of the wheel loader 1 and the object. The relative position to the object includes a distance to the object. The non-contact sensor 22 includes a radar device capable of detecting an object by scanning the periphery of the wheel loader 1 with radio waves. Note that the non-contact sensor 22 may include a laser scanner device capable of detecting an object by scanning the periphery of the wheel loader 1 with a laser beam. The non-contact sensor 22 may include an ultrasonic sensor device capable of detecting an object by scanning the periphery of the wheel loader 1 with ultrasonic waves. Note that the non-contact sensor 22 is not limited to the radar device, the laser scanner device, and the ultrasonic sensor device. In the following description, energy waves used for scanning to detect an object, such as radio waves, a laser beam, and ultrasonic waves, are referred to as detection waves, as appropriate.

The non-contact sensors 22 are provided on the outer surface of the vehicle body 2 of the wheel loader 1. The non-contact sensors 22 include a non-contact sensor 22A, a non-contact sensor 22B, a non-contact sensor 22C, and a non-contact sensor 22D provided at the vehicle body rear part 2R. Each of detection regions DA to DD of the non-contact sensors 22A to 22D may partially overlap with a detection region of an adjacent non-contact sensor 22.

The non-contact sensor 22A is provided at the rear part of the outer surface on the right side of the vehicle body rear part 2R, and detects an object in the detection region DA defined on the right side of the vehicle body 2. The detection region DA extends radially to the right from the non-contact sensor 22A.

The non-contact sensor 22B is provided at a right part of the outer surface on the rear side of the vehicle body rear part 2R, and detects an object in the detection region DB defined behind and on the rear-left side of the vehicle body 2. The detection region DB extends radially to the rear-left side from the non-contact sensor 22B.

The non-contact sensor 22C is provided at a left part of the outer surface on the rear side of the vehicle body rear part 2R, and detects an object in the detection region DC defined at the rear side and the rear-right side of the vehicle body 2. The detection region DC extends radially to the rear-right side from the non-contact sensor 22C.

The non-contact sensor 22D is provided at the rear part of the outer surface on the left side of the vehicle body rear part 2R, and detects an object in the detection region DD defined on the left side of the vehicle body 2. The detection region DD extends radially to the left from the non-contact sensor 22D.

In the following description, the detection region DA, the detection region DB, the detection region DC, and the detection region DD are collectively referred to as the detection region D, as appropriate. The detection region D is a region to be scanned with the detection waves.

A point included in the detection region of any of the non-contact sensors 22A to 22D corresponds to the detection region D of all of the non-contact sensors 22. A detection range setting unit 74 as described later sets a detection range TD in the detection region D. Further, an alarm range specifying unit 75 as described later specifies an alarm range TA in the detection region D.

The detection regions DA to DD of the respective non-contact sensors 22A to 22D are not simply fan-shaped regions, but are regions of which left and right ends are partially cut out. This is to prevent, for example, an end portion of the working equipment from being caught on end portions of the detection regions DA and DD of the non-contact sensors 22A and 22D at opposite ends and thus being erroneously recognized as an obstacle, when swinging. In addition, this is because the wheel loader 1 is articulated type work machine, and when the wheel loader 1 is steered to swing to the maximum, the working equipment is tilted greatly with respect to the vehicle body rear part, and an end portion of the working equipment may be caught on the end portions of the detection regions DA and DD. The configuration in which the detection regions DA to DD of the non-contact sensors 22A to 22D are regions of which end portions are partially cut out is not limited to the articulated type work machine, but can also be applied to, for example, a non-contact sensor provided in an excavator and a forklift. Therefore, it is possible to prevent the non-contact sensor from erroneously detecting the working equipment during the swinging of the excavator and the forklift.

The object detection device 20 can detect an object present in each of different regions in the periphery of the wheel loader 1 by using the plurality of cameras 21 and the plurality of non-contact sensors 22.

[Periphery Monitoring System]

Figure 3:
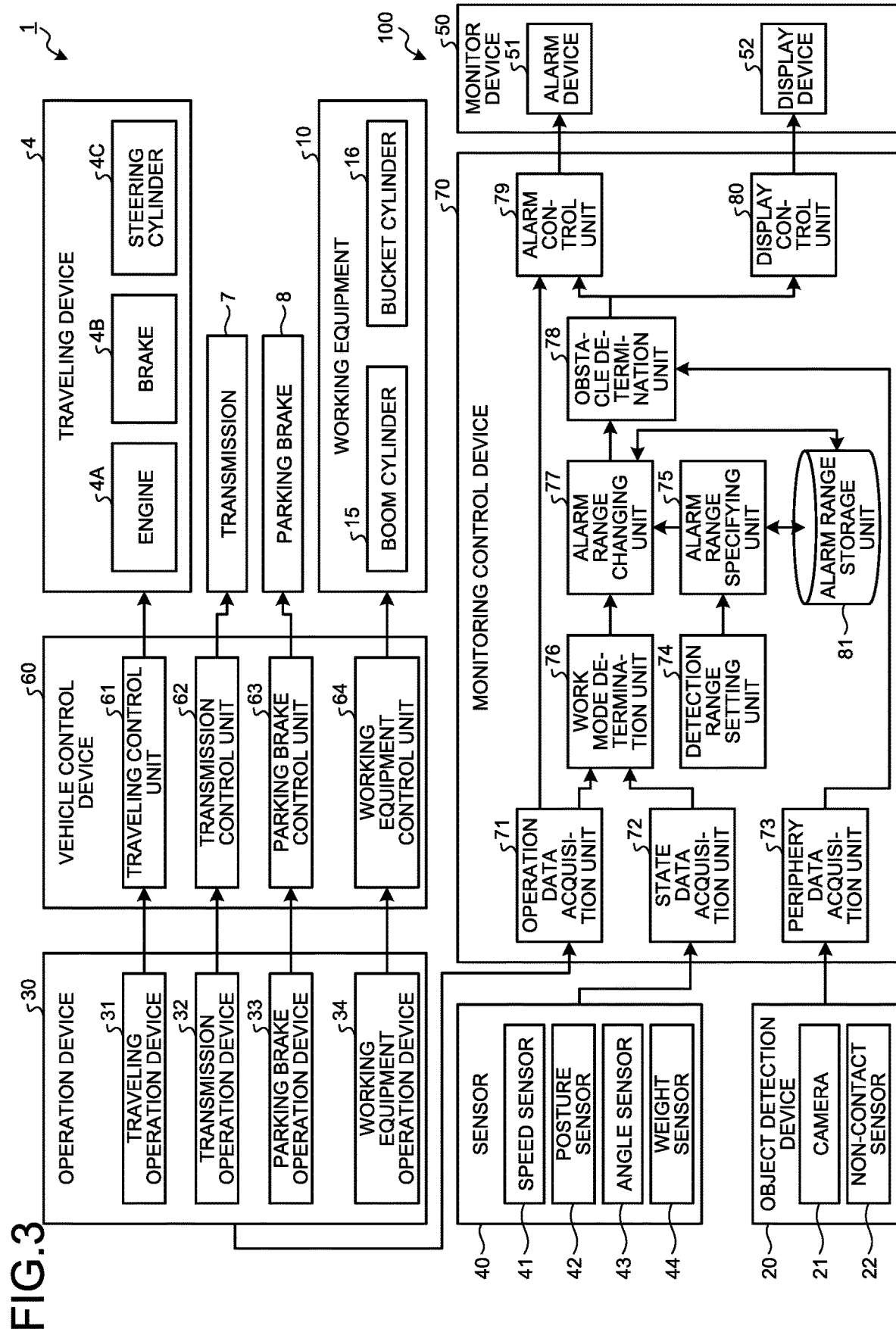
FIG. 3 is a block diagram illustrating the work vehicle.

FIG. 3 is a block diagram illustrating the wheel loader 1. The wheel loader 1 includes an operation device 30 operated by the driver, a sensor 40 that detects the state of the wheel loader 1, a vehicle control device 60, and the periphery monitoring system 100. The periphery monitoring system 100 includes the object detection device 20, a monitoring control device 70, and a monitor device 50. Each of the vehicle control device 60 and the monitoring control device 70 includes a computer system and is mounted on the wheel loader 1. The vehicle control device 60 controls the traveling device 4, the transmission 7, and the working equipment 10. The monitoring control device 70 controls the monitor device 50.

<Operation Device>

The operation device 30 is arranged in the driver's cab 3R and is operated by the driver. The operation device 30 includes a traveling operation device 31, a transmission operation device 32, a parking brake operation device 33, and a working equipment operation device 34.

The traveling operation device 31 is operated to activate the traveling device 4. The traveling operation device 31 includes an accelerator pedal, a brake pedal, and a steering lever. As the accelerator pedal is operated, the engine 4A generates a driving force. As the brake pedal is operated, the brake 4B generates a braking force. As the steering lever is operated, the steering cylinder 4C extends and retracts, and the wheel loader 1 swings.

The transmission operation device 32 is operated to activate the transmission 7. The transmission operation device 32 includes a forward/rearward movement switch, a shift-up switch, and a shift-down switch. As the forward/rearward movement switch is operated, the rotation direction of the output shaft of the transmission 7 is switched, and the wheel loader 1 moves forward or rearward. As at least one of the shift-up switch or the shift-down switch is operated, the gear stage of the transmission 7 is changed. As the shift-up switch is operated, the gear stage of the transmission 7 is raised and the gear ratio of the transmission 7 is reduced. As the shift-down switch is operated, the gear stage of the transmission 7 is lowered, and the gear ratio of the transmission 7 is increased. Note that the function of each of the forward/rearward movement switch, the shift-up switch, and the shift-down switch may be exhibited by operating one operation member (operation lever or the like).

The parking brake operation device 33 is operated to activate a parking brake 8 of the wheel loader 1. The parking brake operation device 33 includes a parking brake switch. As the parking brake switch is operated, the parking brake 8 generates a braking force.

The working equipment operation device 34 is operated to activate the working equipment 10. The working equipment operation device 34 includes a boom lever and a bucket lever. As the boom lever is operated, the boom cylinder 15 extends and retracts to activate the boom 11. As the bucket lever is operated, the bucket cylinder 16 extends and retracts to activate the bucket 12.

<Sensor>

The sensor 40 includes a speed sensor 41, a posture sensor 42, an angle sensor 43, and a weight sensor 44.

The speed sensor 41 detects the traveling speed of the wheel loader 1. The speed sensor 41 detects the traveling speed of the wheel loader 1 by detecting, for example, the rotation speed of the wheel 5 per unit time.

The posture sensor 42 detects the posture of the vehicle body 2. The posture of the vehicle body 2 includes at least one of the inclination angle or the angular velocity of the vehicle body 2 with respect to a horizontal plane. Further, the posture of the vehicle body 2 includes an orientation indicating a direction in which the vehicle body 2 faces. The posture sensor 42 includes an inertial measurement unit (IMU) provided on the vehicle body 2.

The angle sensor 43 detects the angle of the working equipment 10. The angle sensor 43 includes a boom angle sensor that detects the angle of the boom 11 with respect to a reference axis of a vehicle body coordinate system defined on the vehicle body front part 2F, and a bucket angle sensor that detects the angle of the bucket 12 with respect to the boom 11. The angle sensor 43 may be a potentiometer or a stroke sensor that detects the stroke of the boom cylinder 15 and the stroke of the bucket cylinder 16.

The weight sensor 44 detects the weight of the bucket 12. The weight sensor 44 detects the weight of the bucket 12 and detects the weight of the excavated object held in the bucket 12. Further, the weight sensor 44 detects the weight of the bucket 12 and detects whether or not the excavated object is held in the bucket 12.

<Monitor Device>

The monitor device 50 is arranged in the driver's cab 3R. The monitor device 50 includes an alarm device 51 and a display device 52.

The alarm device 51 outputs an alarm. The alarm device 51 includes, for example, a buzzer device, and outputs an alarm sound as an alarm. The alarm device 51 may include a light emitting device such as a lamp and output light as an alarm. The alarm device 51 outputs an alarm, for example, when the non-contact sensor 22 detects an object present in the alarm range TA.

The display device 52 displays display data. The display device 52 includes a flat panel display such as a liquid crystal display (LCD) or an organic electroluminescence (EL) display (OLED). The display device 52 displays, as the display data, image data of the periphery of the wheel loader 1, the image data being acquired by the camera 21. Further, when an obstacle is present in the periphery of the wheel loader 1, the display device 52 displays, as the display data, position data of the obstacle detected by the non-contact sensor 22. The display device 52 displays the position data of the detected obstacle, for example, when the non-contact sensor 22 detects the obstacle present in the detection range TD or the alarm range TA.

<Vehicle Control Device>

The vehicle control device 60 is connected to the operation device 30. When the operation device 30 is operated by the driver, the operation device 30 outputs operation data. The operation data output from the operation device 30 is output to the vehicle control device 60. The vehicle control device 60 outputs a control command for controlling at least one of the traveling device 4, the transmission 7, the parking brake 8, or the working equipment 10, on the basis of the operation data of the operation device 30.

The vehicle control device 60 includes a traveling control unit 61, a transmission control unit 62, a parking brake control unit 63, and a working equipment control unit 64.

The traveling control unit 61 outputs a control command for controlling at least one of the engine 4A, the brake 4B, or the steering cylinder 4C, on the basis of the operation data output from the traveling operation device 31.

The transmission control unit 62 outputs a control command for controlling the rotation direction of the output shaft of the transmission 7 and a control command for controlling the gear stage of the transmission 7, on the basis of the operation data output from the transmission operation device 32.

The parking brake control unit 63 outputs a control command for controlling the parking brake 8, on the basis of the operation data output from the parking brake operation device 33.

The working equipment control unit 64 outputs a control command for controlling at least one of the boom cylinder 15 or the bucket cylinder 16, on the basis of the operation data output from the working equipment operation device 34.

<Monitoring Control Device>

The monitoring control device 70 is connected to the object detection device 20, the operation device 30, and the sensor 40. The monitoring control device 70 outputs a control command for controlling the monitor device 50, on the basis of at least one of periphery data indicating the detection data of the object detection device 20, the operation data of the operation device 30, or state data indicating the detection data of the sensor 40.

The monitoring control device 70 includes an operation data acquisition unit 71, a state data acquisition unit 72, a periphery data acquisition unit 73, a detection range setting unit 74, an alarm range specifying unit 75, a work mode determination unit 76, an alarm range changing unit 77, an obstacle determination unit 78, an alarm control unit 79, a display control unit 80, and an alarm range storage unit 81.

The operation data acquisition unit 71 acquires the operation data output from the operation device 30.

The state data acquisition unit 72 acquires the state data indicating the detection data of the sensor 40. The sensor 40 detects the state data indicating the state of the wheel loader 1. The state data includes at least one of the traveling speed of the wheel loader 1, the posture of the vehicle body 2, the angle of the working equipment 10, or the weight of the bucket 12.

The periphery data acquisition unit 73 acquires the periphery data indicating the detection data of the object detection device 20. The object detection device 20 detects periphery data indicating the situation in the periphery of the wheel loader 1. The periphery data includes presence/absence data of an object and position data of the object present in the periphery of the wheel loader 1, the object being detected by the non-contact sensor 22.

The detection range setting unit 74 sets the detection range TD for the object in the detection region D scanned with the detection waves. The detection range TD refers to a target monitoring range for the object. As illustrated in FIG. 2, the detection range TD is defined as a part of the detection region D. An end portion of the detection region D that is farthest from the non-contact sensor 22 is, for example, 50 [m] or more away from the non-contact sensor 22. At the end portion of the detection region D, the energy of the detection waves is small, and thus object detection accuracy may decrease. Further, in a case where the entire detection region D is set as the target monitoring range, even an object that is unlikely to come into contact with the wheel loader 1 is detected. Further, in a case where the entire detection region D is set as the target monitoring range, the number of data to be processed by the monitoring control device 70 becomes excessively large. Therefore, from the viewpoint of suppressing a decrease in detection accuracy and suppressing an increase in the number of data, a detection range TD that is smaller than the detection region D is set as the target monitoring range for the object. When detecting an object present in the periphery of the wheel loader 1, only detection data of an object present in the detection range TD is adopted, and detection data of an object present outside the detection range TD is deleted.

The alarm range specifying unit 75 specifies the alarm range TA in which an alarm output is required when an object is present. The alarm range specifying unit 75 specifies the alarm range TA in the detection range TD. Specifying the alarm range TA includes a case where the alarm range is set in advance and a case where the alarm range is newly set by an input/output means (not illustrated), and "specifying" of the alarm range is a concept including "setting".

The alarm range storage unit 81 stores data of the alarm range TA specified by the alarm range specifying unit 75. The data of the alarm range TA may be stored in a predetermined storage region (not illustrated), or may be input to a predetermined location in a program of the monitoring control device 70. The alarm range TA in an initial state may be stored in the alarm range storage unit 81, or the alarm range TA may be set/updated by any setting work.

Figure 4:
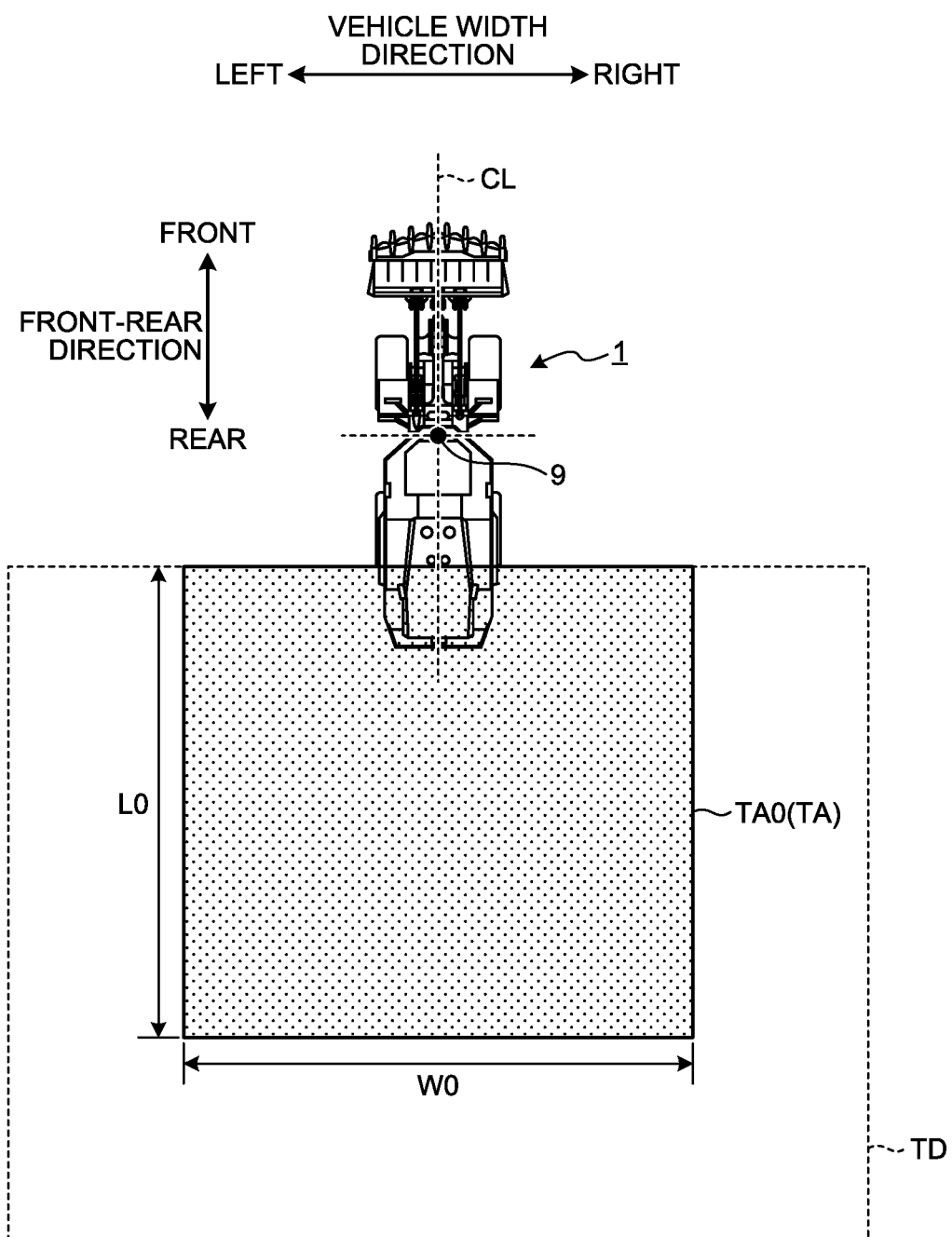
FIG. 4 is a diagram schematically illustrating a detection range and an alarm range.

FIG. 4 is a diagram schematically illustrating the detection range TD and the alarm range TA. As illustrated in FIGS. 2 and 4, the detection range TD is set as a part of the detection region D.

The detection range setting unit 74 defines the detection range TD of the non-contact sensor 22 in at least a portion in the periphery of the wheel loader 1. In an embodiment, the detection range setting unit 74 defines the detection range TD of the non-contact sensor 22 behind a predetermined portion of the wheel loader 1. The predetermined portion is defined as at least a portion of the vehicle body rear part 2R. In an embodiment, the predetermined portion is defined as a portion of the vehicle body rear part 2R that overlaps with a rear end portion of the rear tire 6R in the front-rear direction. The detection range TD is defined behind the rear end portion of the rear tire 6R. Note that the predetermined portion is defined as a portion of the vehicle body rear part 2R that overlaps with the rotation axis RX of the rear tire 6R in the front-rear direction. Further, the detection range TD is defined bilaterally-symmetrically with respect to a center line CL of the wheel loader 1. The center line CL is a line extending in the front-rear direction through the center of the wheel loader 1 in the vehicle width direction.

The detection range TD is defined to have a square shape. In the vehicle width direction, a distance between the center line CL and a left end of the detection range TD is equal to a distance between the center line CL and a right end of the detection range TD. A front end of the detection range TD is parallel to the rotation axis RX. A rear end of the detection range TD is parallel to the front end of the detection range TD. The left end and the right end of the detection range TD are orthogonal to the front end and the rear end of the detection range TD, respectively.

The alarm range specifying unit 75 sets the alarm range TA in the detection range TD. The alarm range TA is a range in which an alarm output is required when an object is present. When an object is present in the alarm range TA, an alarm is output from the alarm device 51. When an object is outside the alarm range TA, even in a case where an object is present in the detection range TD, the alarm device 51 does not output an alarm.

The alarm range TA is defined to have a square shape. A front end of the alarm range TA is parallel to the rotation axis RX. A rear end of the alarm range TA is parallel to the front end of the alarm range TA. Left and right ends of the alarm range TA are orthogonal to the front and rear ends of the alarm range TA, respectively.

In the front-rear direction, the position of the front end of the alarm range TA and the position of the front end of the detection range TD overlap each other. In the front-rear direction, the rear end of the alarm range TA is arranged in front of the rear end of the detection range TD. In the vehicle width direction, a distance between the center line CL and the left end of the alarm range TA is equal to a distance between the center line CL and the right end of the alarm range TA. In the vehicle width direction, the left end of the alarm range TA is arranged between the center line CL and the left end of the detection range TD. In the vehicle width direction, the right end of the alarm range TA is arranged between the center line CL and the right end of the detection range TD.

The alarm range specifying unit 75 sets an initial alarm range TA0 indicating the initial state of the alarm range TA. A dimension of the initial alarm range TA0 indicates an initial value of a dimension of the alarm range TA. As illustrated in FIG. 4, a dimension W of the initial alarm range TA0 in the vehicle width direction is a dimension W0, the dimension W being set by the alarm range specifying unit 75, and a dimension L of the initial alarm range TA0 in the front-rear direction is a dimension L0, the dimension L being set by the alarm range specifying unit 75.

The work mode determination unit 76 determines a work mode of the wheel loader 1. The work mode determination unit 76 determines whether or not the work mode of the wheel loader 1 is a specific work mode.

FIGS. 5 and 6 are each a diagram schematically illustrating a work of the wheel loader 1 in the specific work mode. The wheel loader 1 can perform the excavation work in which the excavation target is excavated using the bucket 12 of the working equipment 10 and the loading work in which the excavated object scooped using the bucket 12 in the excavation work is loaded into the loading target. As the excavation target, the heap of earth DS placed on the ground surface RS is exemplified. As the loading target, a transport vehicle LS is exemplified. As the transport vehicle LS, a dump truck including a dumping bed is exemplified.

As illustrated in FIG. 5(A), the wheel loader 1 performs a first forward movement work F1 to move forward toward the heap of earth DS in order to excavate the heap of earth DS by using the bucket 12 of the working equipment 10, in a state where the excavated object is not held in the bucket 12 of the working equipment 10. The driver operates the operation device 30 to move the wheel loader 1 forward to approach the heap of earth DS as indicated by the arrow in FIG. 5(A). In addition, the driver operates the operation device 30 so that the heap of earth DS is excavated with the bucket 12.

As illustrated in FIG. 5(B), after excavating the heap of earth DS with the bucket 12 and scooping the excavated object with the bucket 12, the wheel loader 1 performs a first rearward movement work R1 to move rearward so as to be away from the heap of earth DS, in a state where the excavated object is held in the bucket 12. The driver operates the operation device 30 to move the wheel loader 1 rearward to be away from the heap of earth DS as indicated by the arrow in FIG. 5(B).

Next, as illustrated in FIG. 6(A), the wheel loader 1 performs a second forward movement work F2 to move forward toward the transport vehicle LS in order to load the excavated object held in the bucket 12 of the working equipment 10 into the transport vehicle LS. The driver operates the operation device 30 to move the wheel loader 1 forward while swinging to approach the transport vehicle LS as indicated by the arrow in FIG. 6(A). Further, the driver operates the operation device 30 so that the excavated object held in the bucket 12 is loaded into a dumping bed of the transport vehicle LS. That is, the driver operates the operation device 30 so that the boom 11 makes upward movement in a state where the wheel loader 1 moves forward so as to approach the transport vehicle LS. After the boom 11 makes upward movement and the bucket 12 is placed above the dumping bed of the transport vehicle LS, the driver operates the operation device 30 so that the bucket 12 is tilted. As a result, the excavated object is discharged from the bucket 12 and loaded into the transport vehicle LS.

As illustrated in FIG. 6(B), after the excavated object is discharged from the bucket 12 and loaded into the dumping bed of the transport vehicle LS, the wheel loader 1 performs a second rearward movement work R2 to move rearward so as to be away from the transport vehicle LS, in a state where the excavated object is not held in the bucket 12 of the working equipment 10. The driver operates the operation device 30 to move the wheel loader 1 rearward to be away from the transport vehicle LS, as indicated by the arrow in FIG. 6(B).

The driver repeats the above operation until the dumping bed BE is full of excavated objects. In the following description, a work mode including a series of works such as the first forward movement work F1, the first rearward movement work R1, the second forward movement work F2, and the second rearward movement work R2 is referred to as a V-shape work mode as appropriate.

The specific work mode includes the first rearward movement work R1 of the V-shape work mode. The work mode determination unit 76 determines whether or not the wheel loader 1 performs the first rearward movement work R1 in the V-shape work mode. In the first rearward movement work R1, the wheel loader 1 moves rearward in the periphery of the transport vehicle LS. After moving rearward in the periphery of the transport vehicle LS, the wheel loader 1 performs the second forward movement work F2 to load the excavated object held in the bucket 12 of the working equipment 10 into the transport vehicle LS.

The work mode determination unit 76 determines the work mode at least on the basis of the operation data of the transmission operation device 32 that is acquired by the operation data acquisition unit 71. When it is determined that the wheel loader 1 moves rearward at a specific gear stage on the basis of the operation data of the transmission operation device 32 that is acquired by the operation data acquisition unit 71, the work mode determination unit 76 determines that the work mode of the wheel loader 1 is the specific work mode. In an embodiment, in a case where the gear stage of the transmission 7 is a low gear stage, the work mode determination unit 76 determines that the work mode of the wheel loader 1 is the specific work mode. In an embodiment, the low gear stage means that the gear stage of the transmission 7 is the first gear stage or the second gear stage.

When working in the V-shape work mode, the driver often operates the transmission operation device 32 so that the gear stage of the transmission 7 is set to the second gear stage. In a case of performing the first forward movement work F1 and the second forward movement work F2 in the V-shape work mode, the driver operates the transmission operation device 32 so that the wheel loader 1 moves forward in a state where the gear stage of the transmission 7 is set to the second gear stage. Further, in a case of performing the first rearward movement work R1 and the second rearward movement work R2 in the V-shape work mode, the driver operates the transmission operation device 32 so that the wheel loader 1 moves rearward in a state where the gear stage of the transmission 7 is set to the second gear stage. The wheel loader 1 performs the first forward movement work F1, the first rearward movement work R1, the second forward movement work F2, and the second rearward movement work R2 in a state where the gear stage is set to the second gear stage, in the V-shape work mode.

On the other hand, when working in a work mode other than the V-shape work mode, the driver often operates the transmission operation device 32 so that the gear stage of the transmission 7 is set to the third or fourth gear stage. In a case of moving the wheel loader 1 forward in a work mode other than the V-shape work mode, the driver operates the transmission operation device 32 so that the wheel loader 1 moves forward in a state where the gear stage of the transmission 7 is set to the third or fourth gear stage. In a case of moving the wheel loader 1 rearward in a work mode other than the V-shape work mode, the driver operates the transmission operation device 32 so that the wheel loader 1 moves rearward in a state where the gear stage of the transmission 7 is set to the third or fourth gear stage. The wheel loader 1 moves forward or rearward in a state where the gear stage is set to the third or fourth gear stage, in a work mode other than the V-shape work mode.

Therefore, when it is determined that the wheel loader 1 moves rearward at the second gear stage, the work mode determination unit 76 can determine that the work mode of the wheel loader 1 is the first rearward movement work R1 of the V-shape work mode.

When the work mode determination unit 76 determines that the work mode of the wheel loader 1 is the specific work mode, the alarm range changing unit 77 changes the alarm range TA in the detection range TD. The alarm range changing unit 77 changes the alarm range TA in the detection range TD so that the alarm range TA does not protrude from the detection range TD. The change of the alarm range TA includes at least one of a change of the area of the alarm range TA, a change of the position of the alarm range TA, or a change of the shape of the alarm range TA. When the alarm range changing unit 77 changes the alarm range TA, data of the alarm range TA stored in the alarm range storage unit 81 is updated to data of the changed alarm range TA. Further, when a predetermined condition that the work mode of the wheel loader 1 is the specific work mode is satisfied, the alarm range changing unit 77 updates the data of the alarm range TA stored in the alarm range storage unit 81 to the data of the changed alarm range TA. However, when the predetermined condition is not satisfied, the alarm range changing unit 77 may update the data of the changed alarm range TA to the data of the alarm range TA before the change.

Figure 7:
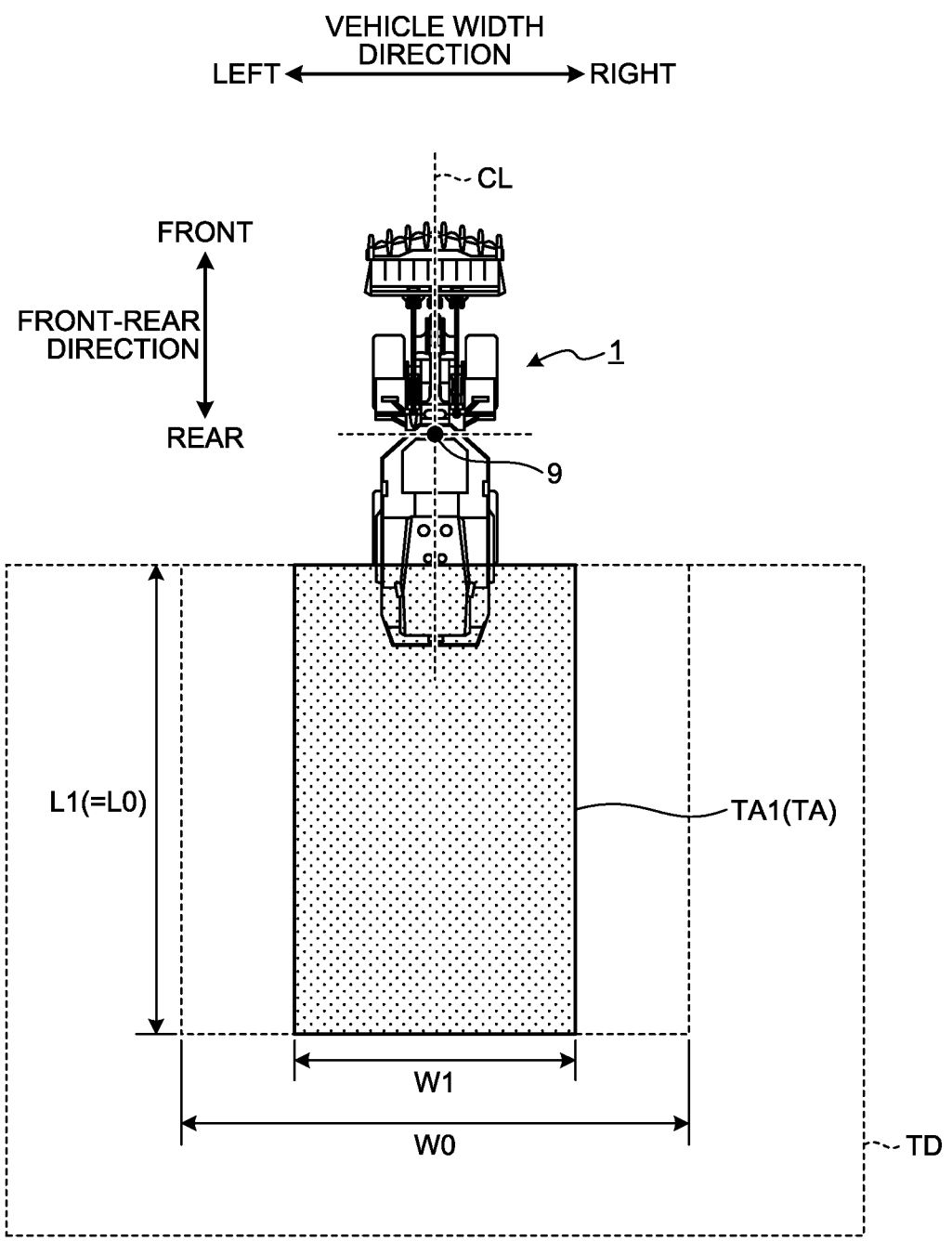
FIG. 7 is a diagram schematically illustrating a changed alarm range that indicates an alarm range after being changed by an alarm range changing unit.

FIG. 7 is a diagram schematically illustrating a changed alarm range TA1 that indicates the alarm range TA after being changed by the alarm range changing unit 77. As illustrated in FIG. 7, when it is determined that the wheel loader 1 performs the first rearward movement work R1 in the V-shape work mode, the alarm range changing unit 77 changes the alarm range TA (initial alarm range TA0) so that the dimension W in the vehicle width direction is smaller than the initial dimension W0. A dimension W1 of the changed alarm range TA1 in the vehicle width direction is smaller than the dimension W0 of the initial alarm range TA0 in the vehicle width direction, the changed alarm range TA1 indicating the alarm range TA after being changed by the alarm range changing unit 77, and the initial alarm range TA0 being set by the alarm range specifying unit 75.

Note that the alarm range changing unit 77 does not change the dimension L of the alarm range TA in the front-rear direction. That is, the dimension L1 of the changed alarm range TA1 in the front-rear direction is equal to the dimension L0 of the initial alarm range TA0 in the front-rear direction.

The alarm range changing unit 77 sets the changed alarm range TA1 to have a square shape. A front end of the changed alarm range TA1 overlaps with the front end of the detection range TD. In the vehicle width direction, a distance between the center line CL and a left end of the changed alarm range TA1 is equal to a distance between the center line CL and a right end of the changed alarm range TA1.

The obstacle determination unit 78 acquires, from the periphery data acquisition unit 73, the periphery data indicating the detection data of the non-contact sensor 22. The obstacle determination unit 78 determines whether or not an object (obstacle) is present in the alarm range TA. In a case where the alarm range TA is not changed by the alarm range changing unit 77, the obstacle determination unit 78 determines whether or not an object is present in the initial alarm range TA0. In a case where the alarm range TA is changed by the alarm range changing unit 77, the obstacle determination unit 78 determines whether or not an object is present in the changed alarm range TA1.

The outer shape of the obstacle is smaller than the outer shape of the wheel loader 1. As the obstacle, a manned vehicle such as a pickup truck that manages a work site is exemplified.

When the obstacle determination unit 78 determines that an object is present in the alarm range TA, the alarm control unit 79 outputs, as a control command, an alarm command for causing the alarm device 51 to output an alarm. As an alarm is output from the alarm device 51, the driver can recognize that an obstacle is present in the alarm range TA.

The alarm control unit 79 outputs the alarm command when an object is present in the alarm range TA in a state where the wheel loader 1 moves rearward. The alarm control unit 79 does not output the alarm command in a state where the wheel loader 1 moves forward or is stopped. The alarm control unit 79 outputs the alarm command when it is determined that the wheel loader 1 moves rearward and when it is determined that an object is present in the alarm range TA, on the basis of the operation data of the transmission operation device 32. The alarm control unit 79 does not output the alarm command when it is determined that the wheel loader 1 moves forward, on the basis of the operation data of the transmission operation device 32, regardless of the presence/absence of an object in the alarm range TA. The alarm control unit 79 does not output the alarm command when it is determined that the wheel loader 1 is stopped, on the basis of the operation data of the parking brake operation device 33, regardless of the presence/absence of an object in the alarm range TA.

The display control unit 80 outputs, as a control command, a display command for displaying the display data on the display device 52. The display control unit 80 causes the display device 52 to display, as the display data, image data acquired by the camera 21 and position data of an object, the position data being acquired by the non-contact sensor 22.

<Display Device>

Figure 8:
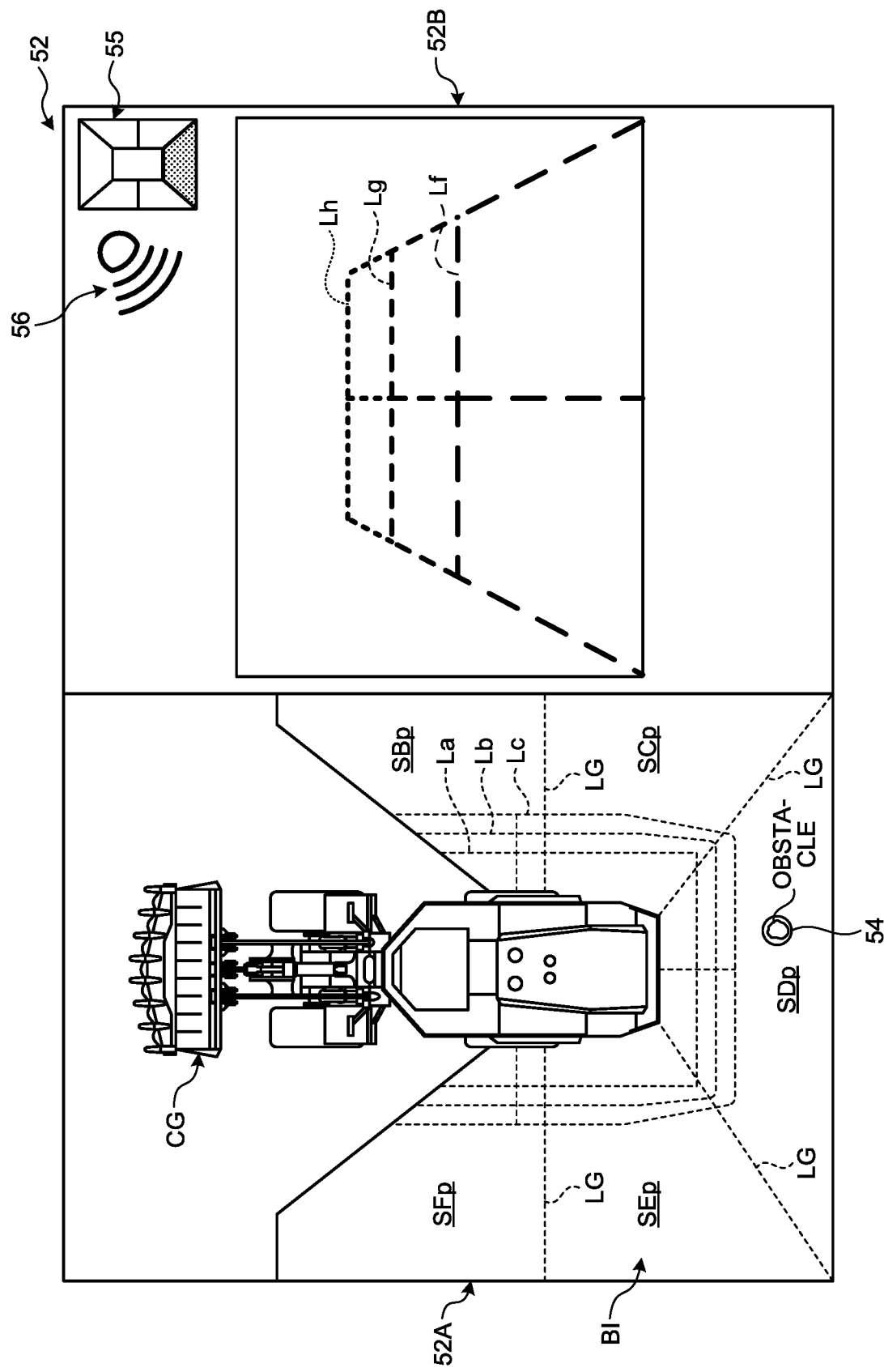
FIG. 8 is a diagram illustrating a display example of a display device.

FIG. 8 is a diagram illustrating a display example of the display device 52. As illustrated in FIG. 8, the display control unit 80 displays a character image CG and a bird's eye image BI of the wheel loader 1 in a first region 52A of a display screen of the display device 52, and displays an image showing a region behind the wheel loader 1 in a second region 52B of the display screen, the image being shot by the camera 21D, and the second region 52B being next to the first region 52A. Note that FIG. 8 illustrates the display example of the display device 52 when the wheel loader 1 moves rearward.

The display control unit 80 displays a line LG indicating a boundary between shooting regions SBp, SCp, SDp, SEp, and SFp of the plurality of cameras 21B, 21C, 21D, 21E, and 21F that acquire image data for generating the bird's eye image BI in a manner in which the line LG is superimposed on the bird's eye image BI.

Further, the display control unit 80 displays lines La, Lb, and Lc indicating distances from an outer edge of the wheel loader 1 in a manner in which the lines La, Lb, and Lc are superimposed on the bird's eye image BI. The outer edge of the wheel loader 1 is a line forming the outer shape of the wheel loader 1 when the wheel loader 1 that is in a posture in which the wheel loader 1 can move straight is viewed from above. For example, the line La indicates that a distance from the outer edge of wheel loader 1 is 3 [m], the line Lb indicates that the distance from the outer edge of wheel loader 1 is 5 [m], and the line Lc indicates that the distance from the outer edge of wheel loader 1 is 7 [m].

Further, the display control unit 80 displays a mark 54 indicating position data of an obstacle present in the detection range TD in a manner in which the mark 54 is superimposed on the bird's eye image BI, the obstacle being detected by the non-contact sensor 22. For example, when an obstacle present behind the wheel loader 1 is detected by the non-contact sensor 22, the display control unit 80 displays the mark 54 in a manner in which the mark 54 is superimposed on the obstacle displayed in the bird's eye image BI, on the basis of position data of the obstacle. By doing so, the presence of the obstacle is emphasized, and the driver of the wheel loader 1 can quickly recognize the presence/absence of the obstacle and the position of the obstacle.

In the second region 52B, an indicator 55 indicating the shooting region of the camera 21 that is displayed in the second region 52B among the shooting regions of the plurality of cameras 21 is displayed.

Further, in the second region 52B, an icon 56, which is display data indicating that the alarm device 51 is in a state where an alarm can be output, is displayed. When the alarm device 51 is in a state where an alarm can be output, the icon 56 is displayed. When the alarm device 51 is in a state where an alarm cannot be output, the icon 56 is not displayed. Depending on whether or not the icon 56 is displayed, the driver can recognize whether or not the alarm device 51 can output an alarm.

When the wheel loader 1 moves rearward, the display control unit 80 displays lines Lf, Lg, and Lh indicating distances from a rear end portion of the wheel loader 1 in a manner in which the lines Lf, Lg, and Lh are superimposed on an image obtained by shooting. The rear end portion of the wheel loader 1 can be set as, for example, a rear end of a rear bumper provided at the rearmost portion of the vehicle body rear part 2R.

In the following description, a display command for displaying the mark 54 indicating position data of an obstacle in a case where the obstacle is present in the detection range TD is referred to as a position display command as appropriate, and a display command for not displaying the mark 54 in a case where no obstacle is present in the detection range TD is referred to as a normal display command as appropriate.

[Periphery Monitoring Method]

Figure 9:
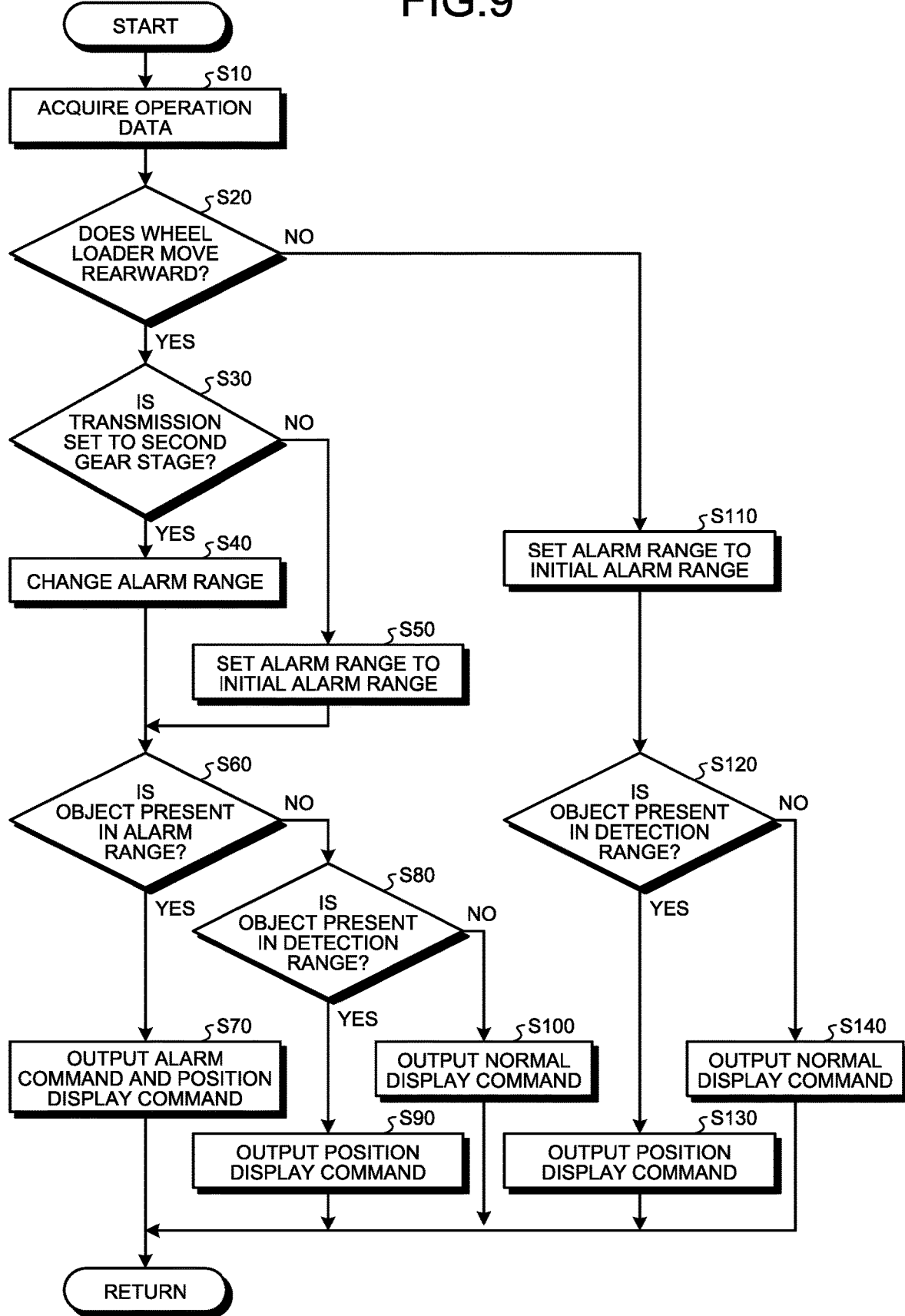
FIG. 9 is a flowchart illustrating a periphery monitoring method.

FIG. 9 is a flowchart illustrating a periphery monitoring method. The detection range setting unit 74 defines the detection range TD of the non-contact sensor 22 behind the predetermined portion of the wheel loader 1. The alarm range specifying unit 75 sets the alarm range TA in which an alarm output is required when an object is present, in the detection range TD defined by the detection range setting unit 74.

The operation data acquisition unit 71 acquires operation data generated by operating the operation device 30 (Step S10).

The operation data acquisition unit 71 acquires the operation data of the transmission operation device 32. Further, the operation data acquisition unit 71 acquires the operation data of the parking brake operation device 33.

The work mode determination unit 76 determines whether or not the wheel loader 1 moves rearward on the basis of the operation data of the forward/rearward switch of the transmission operation device 32, the operation data being acquired by the operation data acquisition unit 71 (Step S20).

In a case where it is determined in Step S20 that the wheel loader 1 moves rearward (Step S20: Yes), the work mode determination unit 76 determines whether or not the transmission 7 is set to the second gear stage which is the specific gear stage on the basis of the operation data of the shift-up switch and the shift-down switch of the transmission operation device 32 (Step S30).

When it is determined in Step S30 that the transmission 7 is set to the second gear stage (Step S30: Yes), the work mode determination unit 76 determines that the work mode of the wheel loader 1 is the specific work mode. The work mode determination unit 76 determines that the wheel loader 1 performs the first rearward movement work R1 in the V-shape work mode. The alarm range changing unit 77 changes the alarm range TA set by the alarm range specifying unit 75 (Step S40).

As described with reference to FIG. 7, the alarm range changing unit 77 changes the initial alarm range TA0 to the changed alarm range TA1 so that the dimension W in the vehicle width direction decreases.

In a case where it is determined in Step S30 that the transmission 7 is not set to the second gear stage (Step S30: No), the work mode determination unit 76 determines that the work mode of the wheel loader 1 is a work mode other than the specific work mode. The work mode determination unit 76 determines that the wheel loader 1 moves rearward in a work mode other than the V-shape work mode. The alarm range changing unit 77 does not change the alarm range TA. The alarm range TA is set to the initial alarm range TA0 set by the alarm range specifying unit 75 (Step S50).

The obstacle determination unit 78 determines whether or not an object (obstacle) is present in the alarm range TA on the basis of the periphery data acquired by the periphery data acquisition unit 73 (Step S60).

In a case where the alarm range TA is changed to the changed alarm range TA1, the obstacle determination unit 78 determines whether or not an object is present in the changed alarm range TA1. In a case where the alarm range TA is not changed to the changed alarm range TA1, the obstacle determination unit 78 determines whether or not an object is present in the initial alarm range TA0.

In a case where it is determined in Step S60 that an object is present in the alarm range TA (Step S60: Yes), the alarm control unit 79 outputs the alarm command for causing the alarm device 51 to output an alarm. Further, the display control unit 80 outputs the position display command for causing the display device 52 to additionally display the mark 54 (Step S70).

In a case where it is determined in Step S60 that no object is present in the alarm range TA (Step S60: No), the obstacle determination unit 78 determines whether or not an object is present outside the alarm range TA, but inside the detection range TD (Step S80).

In a case where it is determined in Step S80 that no object is present in the alarm range TA, but an object is present in the detection range TD (Step S80: Yes), the display control unit 80 outputs the position display command for causing the display device 52 to additionally display the mark 54 (Step S90).

Note that in a case where it is determined in Step S80 that an object is present in the detection range TD, but no object is present in the alarm range TA, the alarm control unit 79 does not output the alarm command.

In a case where it is determined in Step S80 that no object is present in the detection range TD (Step S80: No), the display control unit 80 outputs the normal display command for causing the display device 52 not to display the mark 54 (Step S100).

In a case where it is determined in Step S20 that the wheel loader 1 does not move rearward (Step S20: No), the alarm range TA is not changed and is set to the initial alarm range TA0 set by the alarm range specifying unit 75 (Step S110).

The obstacle determination unit 78 determines whether or not an object (obstacle) is present in the detection range TD on the basis of the periphery data acquired by the periphery data acquisition unit 73 (Step S120).

In a case where it is determined in step S120 that an object is present in the detection range TD (Step S120: Yes), the display control unit 80 outputs the position display command for causing the display device 52 to additionally display the mark 54 (Step S130).

Note that, in Step S130, no alarm command is output from the alarm control unit 79.

In a case where it is determined in Step S120 that no object is present in the detection range TD (Step S120: No), the display control unit 80 outputs the normal display command for causing the display device 52 not to display the mark 54 (Step S140).

[Computer System]

Figure 10:
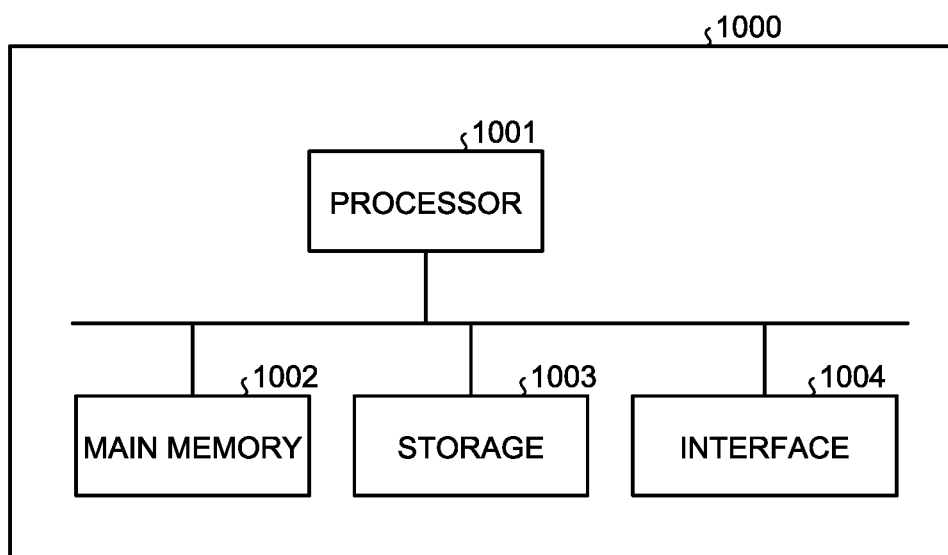
FIG. 10 is a block diagram illustrating a computer system.

FIG. 10 is a block diagram illustrating a computer system 1000. Each of the vehicle control device 60 and the monitoring control device 70 described above includes the computer system 1000. The computer system 1000 includes a processor 1001 such as a central processing unit (CPU), a main memory 1002 including a non-volatile memory such as a read only memory (ROM) and a volatile memory such as a random access memory (RAM), a storage 1003, and an interface 1004 including an input/output circuit. The functions of the vehicle control device 60 and the functions of the monitoring control device 70 described above are stored as a program in the storage 1003. The processor 1001 reads the program from the storage 1003, loads the program to the main memory 1002, and performs the above-described processing according to the program. Note that the program may be distributed to the computer system 1000 via a network.

[Effects]

As described above, when it is determined that the work mode of the wheel loader 1 is the specific work mode, the alarm range TA, in which an alarm output is required when an object is present, is changed. In an embodiment, the alarm range TA is changed so that the dimension in the vehicle width direction of the wheel loader 1 decreases. As a result, an unnecessary alarm is suppressed from being output from the alarm device 51.

Figure 11:
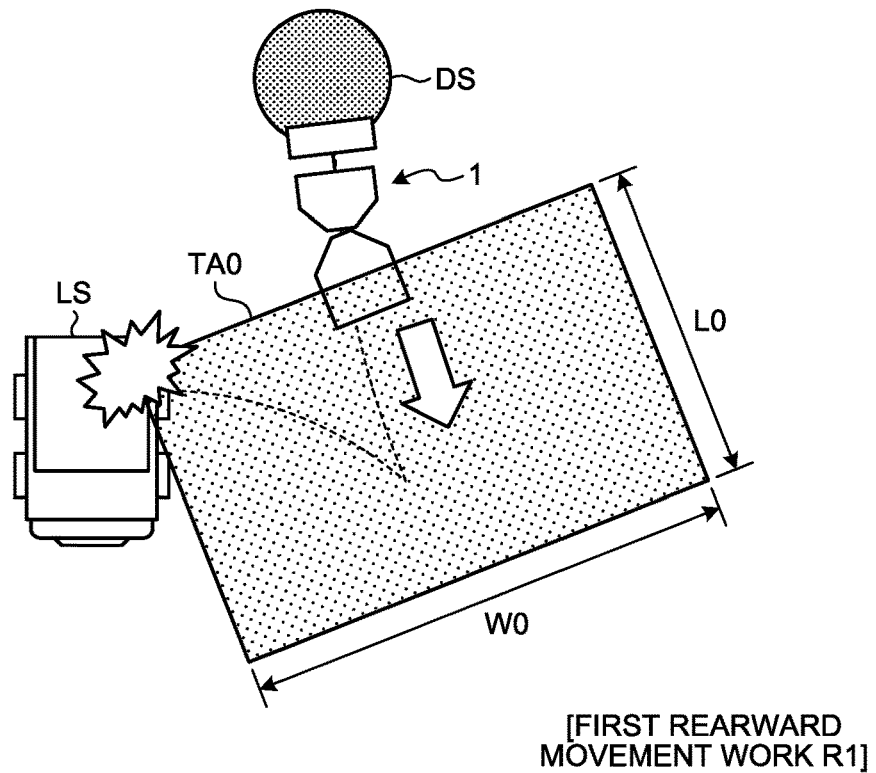
FIG. 11 is a diagram illustrating a state where the work vehicle executes a first rearward movement work in a state where an initial alarm range is maintained without changing the alarm range.

FIG. 11 is a diagram illustrating a state where the wheel loader 1 performs the first rearward movement work R1 in the V-shape work mode in a state where the alarm range TA is not changed and the initial alarm range TA0 is maintained. In the first rearward movement work R1, the wheel loader 1 moves rearward in the periphery of the transport vehicle LS. The outer shape of the initial alarm range TA0 is large. As illustrated in FIG. 11, in a case where the initial alarm range TA0 is maintained, there is a high possibility that the transport vehicle LS enters the initial alarm range TA0 when the wheel loader 1 moves rearward in the vicinity of the transport vehicle LS. The transport vehicle LS is not an obstacle, but an object necessary for the work of the wheel loader 1.

In a case where the transport vehicle LS enters the initial alarm range TA0, the obstacle determination unit 78 erroneously determines that an obstacle is present in the initial alarm range TA0, and the alarm control unit 79 outputs the alarm command for causing the alarm device 51 to output an alarm. In the V-shape work mode, the driver performs the first rearward movement work R1 while fully recognizing the presence of the transport vehicle LS. In a case where the non-contact sensor 22 detects the transport vehicle LS as an obstacle, the alarm device 51 outputs an unnecessary alarm, even though the driver is fully aware of the situation in the periphery of the wheel loader 1. As a result, the driver may feel troublesome.

Figure 12:
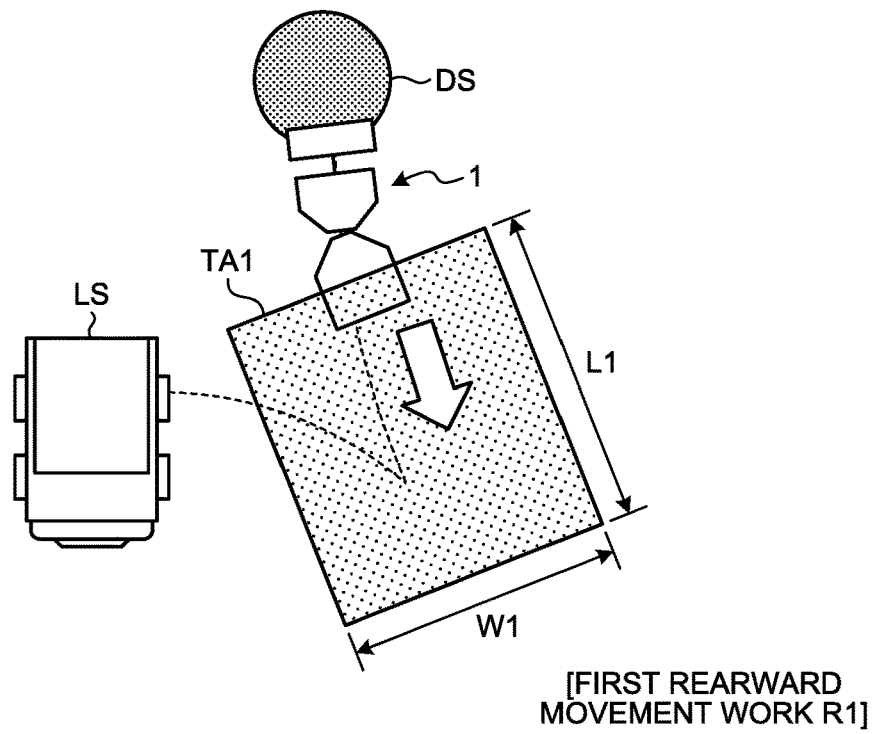
FIG. 12 is a diagram illustrating a state where the work vehicle executes the first rearward movement work in a state where the alarm range is changed to the changed alarm range.

FIG. 12 is a diagram illustrating a state where the wheel loader 1 performs the first rearward movement work R1 in the V-shape work mode in a state where the alarm range TA is changed to the changed alarm range TA1. As illustrated in FIG. 12, the dimension W1 of the changed alarm range TA1 in the vehicle width direction is smaller than the dimension W0 of the initial alarm range TA0 in the vehicle width direction. As illustrated in FIG. 11, as the alarm range TA is changed to the changed alarm range TA1, it is possible to suppress the transport vehicle LS from entering the changed alarm range TA1 when the wheel loader 1 moves rearward in the periphery of the transport vehicle LS. In the example illustrated in FIG. 12, the transport vehicle LS is present on the left side of the wheel loader 1 when the first rearward movement work R1 is performed. The alarm range changing unit 77 changes the alarm range TA so that the end (left end) of the alarm range TA that is closest to the transport vehicle LS is away from the transport vehicle LS when the wheel loader 1 moves rearward. As a result, it is possible to suppress the non-contact sensor 22 from detecting the transport vehicle LS as an obstacle in a state where the driver is fully aware of the situation in the periphery of the wheel loader 1. Therefore, an unnecessary alarm is suppressed from being output from the alarm device 51.

Note that FIG. 12 illustrates an example in which the transport vehicle LS is present on the left side of the wheel loader 1 when the first rearward movement work R1 is performed. In a case where the transport vehicle LS is on the right side of the wheel loader 1 when the first rearward movement work R1 is performed, the alarm range changing unit 77 changes the alarm range TA so that the end (right end) of the alarm range TA that is closest to the transport vehicle LS is away from the transport vehicle LS when the wheel loader 1 moves rearward.

In an embodiment, in the first rearward movement work R1, the dimension L of the alarm range TA in the front-rear direction is not changed, and the dimension L1 of the changed alarm range TA1 is equal to the dimension L0 of the initial alarm range TA0. As a result, the dimension of the alarm range TA behind the vehicle body rear part 2R of the wheel loader 1 is sufficiently maintained. Therefore, in a case where an obstacle is present directly behind the vehicle body rear part 2R, the obstacle determination unit 78 can detect that the obstacle is present in the alarm range TA. The alarm control unit 79 can output the alarm command to the alarm device 51.

When the work mode of the wheel loader 1 is not the specific work mode, the initial alarm range TA0 is maintained as the alarm range TA. As a result, in a case where an obstacle is present in the periphery of the wheel loader 1 when the driver moves the wheel loader 1 rearward, the alarm control unit 79 can output the alarm command to the alarm device 51 to output a necessary alarm.

The detection range TD is defined behind the predetermined portion of the wheel loader 1. A region in front of the wheel loader 1 and regions on the sides of the wheel loader 1 are visible to the driver. Further, the wheel loader 1 is an articulated type work vehicle that is bent at the joint mechanism 9, and the predetermined portion is defined as at least a portion of the vehicle body rear part 2R. Therefore, for example, in a case where the non-contact sensor 22 that scans a diagonally front side is arranged on the outer surface on the left side or the right side of the vehicle body rear part 2R, there is a possibility that at least a portion of the vehicle body front part 2F enters the detection region of the non-contact sensor 22 when the vehicle body front part 2F is bent via the joint mechanism 9. Therefore, the detection range TD does not have to be defined in the region in front of the wheel loader 1 and the regions on the sides of the wheel loader 1. Since it is not necessary to provide the non-contact sensor 22 that scans the region in front of the wheel loader 1 and the regions on the sides of the wheel loader 1, the cost of the wheel loader 1 is reduced.

Further, since the wheel loader 1 is an articulated type work vehicle that is bent at the joint mechanism 9, when the wheel loader 1 moves rearward while swinging, the front tire 6F can pass through a portion where the rear tire 6R passes on the ground surface RS. That is, an inner ring difference of the wheel loader 1 is sufficiently small. Therefore, even in a case where the wheel loader 1 moves rearward in a state where an obstacle is present on the side of the wheel loader 1, the contact between the wheel loader 1 and the obstacle is sufficiently suppressed.

[Other Embodiments]

In the above-described embodiment, the work mode determination unit 76 determines whether or not the wheel loader 1 performs the specific work mode on the basis of the operation data of the transmission operation device 32 that operates the transmission 7 included in the wheel loader 1. The work mode determination unit 76 may determine the work mode of the wheel loader 1 on the basis of the state data detected by the sensor 40. Further, the work mode determination unit 76 may determine the work mode of the wheel loader 1 on the basis of at least one of the operation data of the transmission operation device 32 or the detection data of the sensor 40. Further, the work mode determination unit 76 may determine the work mode of the wheel loader 1 on the basis of at least one of the operation data of the traveling operation device 31 or the operation data of the working equipment operation device 34, in addition to the operation data of the transmission operation device 32.

In the V-shape work mode, the wheel loader 1 repeats a predetermined operation in a predetermined order. For example, the traveling speed of the traveling device 4, the traveling direction (forward or rearward) of the traveling device 4, the posture of the vehicle body 2, the angle of the working equipment 10, and the weight of the bucket 12 each change in a predetermined order under predetermined conditions. That is, in the first forward movement work F1 of the V-shape work mode, the wheel loader 1 moves forward in a state where the distal end portion 12B of the bucket 12 is in contact with the ground surface RS. In the first rearward movement work R1, the wheel loader 1 moves rearward while the bucket 12 makes tilting movement and the boom 11 makes upward movement. In the second forward movement work F2, the boom 11 makes upward movement and the bucket 12 makes dumping movement while the wheel loader 1 moves forward. In the second rearward movement work R2, the wheel loader 1 moves rearward while the boom 11 makes downward movement. Further, in the first forward movement work F1 and the second rearward movement work R2, the excavated object is not held in the bucket 12, and in the first rearward movement work R1 and the second forward movement work F2, the excavated object is held in the bucket 12.

In this way, in the V-shape work mode, the wheel loader 1 repeats a predetermined operation in a predetermined order, such that it is possible to specify the work mode by detecting the state of the wheel loader 1 such as the traveling speed of the traveling device 4, the traveling direction of the traveling device 4, the posture of the vehicle body 2, the angle of the working equipment 10, and the weight of the bucket 12. Therefore, the work mode determination unit 76 can determine whether or not the wheel loader 1 performs the specific work mode, on the basis of the state data indicating the detection data of the sensor 40 including the speed sensor 41 that detects the traveling speed of the traveling device 4, the posture sensor 42 that detects the posture of the vehicle body 2, the angle sensor 43 that detects the angle of the working equipment 10, and the weight sensor 44 that detects the weight of the bucket 12. The work mode determination unit 76 can determine whether or not the wheel loader 1 performs the specific work mode by combining the operation data of the operation device 30 including the transmission operation device 32, and the state data detected by the sensor 40. In a case where the work mode determination unit 76 determines whether or not the wheel loader 1 performs the specific work mode by using the operation data of the operation device 30 and the state data detected by the sensor 40, the determination may be performed by using an artificial intelligence technology such as machine learning. The work mode determination unit 76 may determine whether or not the wheel loader 1 performs the specific work mode through image recognition based on the artificial intelligence technology by using imaging data shot by the camera 21.

In the above-described embodiment, the alarm range changing unit 77 changes the alarm range TA when it is determined that the work mode of the wheel loader 1 is the specific work mode. The alarm range changing unit 77 may change the alarm range TA in the detection range TD on the basis of the operation data of the transmission operation device 32 that operates the transmission 7 regardless of the work mode of the wheel loader 1. The alarm range changing unit 77 may change the alarm range TA when it is determined that the wheel loader 1 moves rearward at a specific gear stage on the basis of the operation data of the transmission operation device 32. In this case, the work mode determination unit 76 can be omitted.

Further, the alarm range changing unit 77 may change the alarm range TA in the detection range TD on the basis of the detection data of the sensor 40 that detects the state of the wheel loader 1, regardless of the work mode of the wheel loader 1.

As described above, in the V-shape work mode, the gear stage of the transmission 7 is often set to the second gear stage. Note that, in the first forward movement work F1, for example, in a case where the distal end portion 12B of the bucket 12 is inserted into the heap of earth DS and the load on the traveling device 4 increases, the transmission control unit 62 automatically shifts down the gear stage of the transmission 7 from the second gear stage to the first gear stage.

In the above-described embodiment, the alarm range TA is changed when the specific gear stage is the second gear stage and the wheel loader 1 moves rearward at the second gear stage. The specific gear stage may also be the first gear stage. For example, in a case where a movement distance of the wheel loader 1 in each of the first forward movement work F1, the first rearward movement work R1, the second forward movement work F2, and the second rearward movement work R2 of the V-shape work mode is short, the work may be performed in the V-shape work mode in a state where the first gear stage is maintained. In a case where the work is performed in the V-shape work mode in a state where the first gear stage is maintained, the alarm range changing unit 77 may change the alarm range TA when the wheel loader 1 moves rearward at the first gear stage.

In a case where the work is performed in the V-shape work mode in each of a state where the gear stage is set to the first gear stage and a state where the gear stage is set to the second gear stage, the alarm range changing unit 77 may set a dimension W1 of the changed alarm range TA1 in the vehicle width direction when the wheel loader 1 moves rearward at the first gear stage to be smaller than a dimension W1 of the changed alarm range TA1 in the vehicle width direction when the wheel loader 1 moves rearward at the second gear stage. That is, the alarm range changing unit 77 may set the dimension W1 of the changed alarm range TA1 so as to be different on the basis of the gear stage.

In the above-described embodiment, the alarm range changing unit 77 changes the alarm range TA so that the dimension W in the vehicle width direction decreases. The alarm range changing unit 77 may change the alarm range TA so that the dimension L in the front-rear direction decreases, or may change the alarm range TA so that both the dimension L in the front-rear direction and the dimension W in the vehicle width direction become smaller.

In the above-described embodiment, the changed alarm range TA1 is set to be bilaterally symmetrical with respect to the center line CL of the wheel loader 1. The alarm range changing unit 77 may change the alarm range TA so that the end of the alarm range TA that is closest to the transport vehicle LS is away from the transport vehicle LS in the first rearward movement work R1 of the wheel loader 1.

Figure 13:
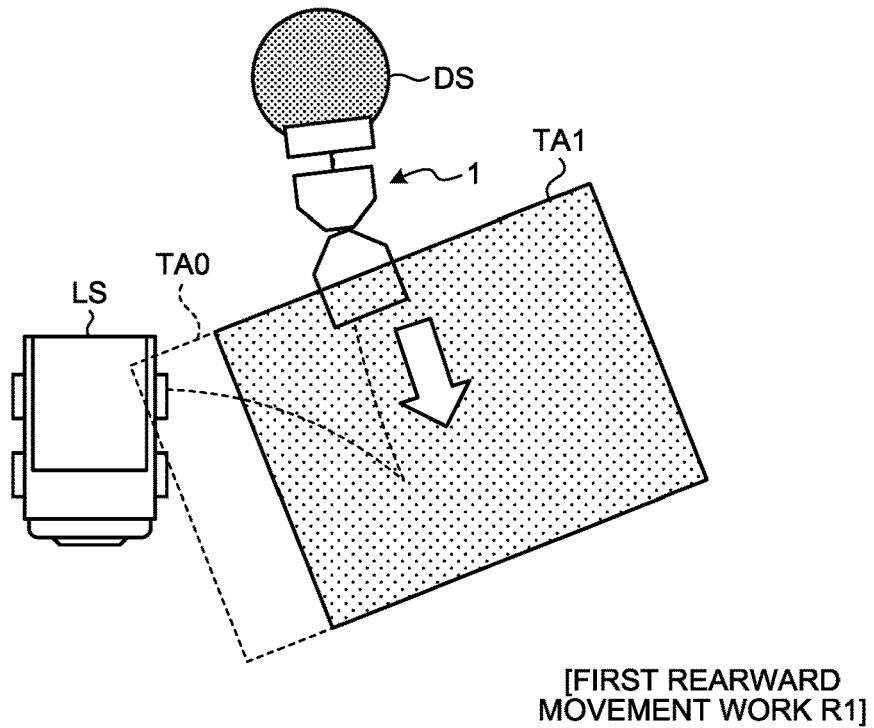
FIG. 13 is a diagram illustrating a state where the alarm range is changed so that an end of the alarm range that is closest to a transport vehicle is away from the transport vehicle.
Figure 14:
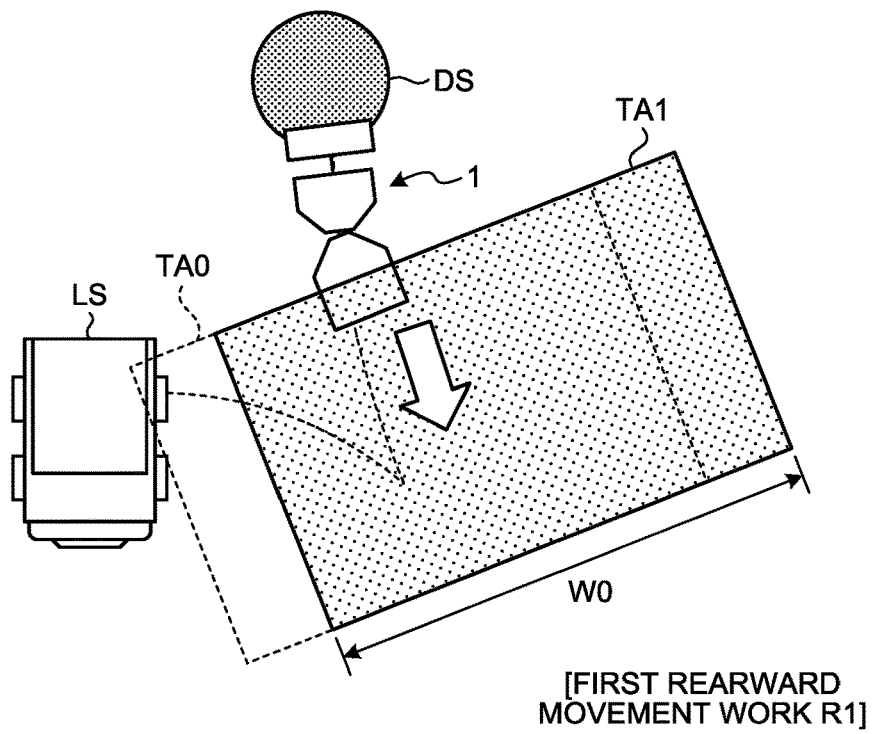
FIG. 14 is a diagram illustrating a state where the alarm range is changed so that the end of the alarm range that is closest to the transport vehicle is away from the transport vehicle.

FIGS. 13 and 14 are each a diagram illustrating a state where the alarm range TA is changed so that the end of the alarm range TA that is closest to the transport vehicle LS is away from the transport vehicle LS.

As illustrated in FIG. 13, in a case where the transport vehicle LS is present on the left side of the wheel loader 1 when the first rearward movement work R1 is performed, the alarm range changing unit 77 changes the position of a left end of the initial alarm range TA0 so that the left end of the changed alarm range TA1 that is closest to the transport vehicle LS is away from the transport vehicle LS when the wheel loader 1 moves rearward. In the example illustrated in FIG. 13, the position of a right end of the initial alarm range TA0 is not changed, and the position of the right end of the changed alarm range TA1 is the same as the position of the right end of the initial alarm range TA0. Also in the example illustrated in FIG. 13, an unnecessary alarm is suppressed from being output from the alarm device 51.

The alarm range changing unit 77 can determine relative positions of the wheel loader 1 and the transport vehicle LS on the basis of the operation data of the steering lever (traveling operation device 31) that operates the steering cylinder 4C (steering device). As illustrated in FIG. 13, in a case where the transport vehicle LS is present on the left side of the wheel loader 1 in the first rearward movement work R1, at least the steering lever is operated so that the wheel loader 1 moves rearward while swinging to the right. In a case where the transport vehicle LS is present on the right side of the wheel loader 1 in the first rearward movement work R1, at least the steering lever is operated so that the wheel loader 1 moves rearward while swinging to the left. Therefore, the alarm range changing unit 77 can determine whether the transport vehicle LS is present on the left side of the wheel loader 1 or the right side of the wheel loader 1 on the basis of at least the operation data of the steering lever, and can change the alarm range TA so that the end of the alarm range TA that is closest to the loading vehicle LS is away from the loading vehicle LS when the wheel loader 1 moves rearward.

In a case where it is determined that the transport vehicle LS is present on the left side of the wheel loader 1 when the first rearward movement work R1 is performed, on the basis of at least the operation data of the steering lever, the alarm range changing unit 77 changes the position of the left end of the initial alarm range TA0 so that the left end of the changed alarm range TA1 that is closest to the transport vehicle LS is away from the transport vehicle LS when the wheel loader 1 moves rearward. Further, in a case where it is determined that the transport vehicle LS is present on the right side of the wheel loader 1 when the first rearward movement work R1 is performed, on the basis of at least the operation data of the steering lever, the alarm range changing unit 77 changes the position of the right end of the initial alarm range TA0 so that the right end of the changed alarm range TA1 that is closest to the transport vehicle LS is away from the transport vehicle LS when the wheel loader 1 moves rearward.

As illustrated in FIG. 14, in a case where the transport vehicle LS is present on the left side of the wheel loader 1 when the first rearward movement work R1 is performed, the alarm range changing unit 77 changes the position of the initial alarm range TA0 so that the left end of the changed alarm range TA1 that is closest to the transport vehicle LS is away from the transport vehicle LS when the wheel loader 1 moves rearward. In the example illustrated in FIG. 14, the size of the initial alarm range TA0 is not changed, and the area of the changed alarm range TA1 is equal to the area of the initial alarm range TA0. The changed alarm range TA1 corresponds to the alarm range TA obtained by moving the position of the initial alarm range TA0 to the right. Also in the example illustrated in FIG. 14, an unnecessary alarm is suppressed from being output from the alarm device 51.

In the above-described embodiment, the change of the alarm range TA includes at least one of a change of the area of the initial alarm range TA0, a change of the position of the initial alarm range TA0, or a change of the shape of the initial alarm range TA0. In addition, the change of the alarm range TA is a concept including removing or invalidating a part of detection data of an object present in the initial alarm range TA0 without changing the area, position, and shape of the initial alarm range TA0.

In the above-described embodiment, the specific work mode in which the alarm range TA is changed is the first rearward movement work R1 of the V-shape work mode. The specific work mode is not limited to the first rearward movement work R1. For example, in a case where walls are present on both sides of a passage of the wheel loader 1 moving rearward and the wheel loader 1 performs a specific work in which the wheel loader 1 has to move rearward in a narrow passage, the alarm range changing unit 77 may change the alarm range TA so that the dimension W in the vehicle width direction decreases.

In the above-described embodiment, the alarm range changing unit 77 may change the alarm range TA so that one or both of the dimension L in the front-rear direction and the dimension W in the vehicle width direction increase. In addition, the alarm range changing unit 77 may change the alarm range TA by sliding the alarm range TA in any one direction, changing the shape of the alarm range TA, bending the alarm range TA, or changing the aspect ratio of the alarm range TA.

In the above-described embodiment, the detection range TD is defined behind the predetermined portion of the wheel loader 1. The detection range TD may be defined in front of the predetermined portion of the wheel loader 1 or may be defined on the side of the wheel loader 1.

In the above-described embodiment, the specific work mode in which the alarm range TA is changed is the first rearward movement work R1, and the alarm range TA is changed in the first rearward movement work R1 of the wheel loader 1. The specific work mode in which the alarm range TA is changed may be at least one of the first forward movement work F1, the first rearward movement work R1, the second forward movement work F2, or the second rearward movement work R2. For example, in the first forward movement work F1 or the second forward movement work F2, in a case where there is a possibility that an unnecessary alarm is output from the alarm device 51, the alarm range changing unit 77 can change the alarm range TA in the first forward movement work F1 or the second forward movement work F2. Further, in a case where there is a possibility that an unnecessary alarm is output from the alarm device 51 in the second rearward movement work R2, the alarm range changing unit 77 can change the alarm range TA in the second rearward movement work R2.

In the above-described embodiment, the specific work mode in which the alarm range TA is changed may be the V-shape work mode. That is, the alarm range changing unit 77 may change the alarm range TA when it is determined that the wheel loader 1 performs the V-shape work mode including the first forward movement work F1 in which the wheel loader 1 moves forward toward the excavation target in order to excavate the excavation target by using the working equipment 10, the first rearward movement work R1 in which the wheel loader 1 moves rearward so as to be away from the excavation target after excavating the excavation target, the second forward movement work F2 in which the wheel loader 1 moves forward toward the loading target in order to load the excavated object held in the working equipment 10 into the loading target, and the second rearward movement work R2 in which the wheel loader 1 moves rearward so as to be away from the loading target after loading the excavated object into the loading target.

In the above-described embodiment, the detection range TD is set and the alarm range TA is set in the detection range TD, but the present invention is not limited to this embodiment. For example, the detection range TD does not have to be set, and a detectable range of the non-contact sensor 22 may be set as the detection range TD.

The operation of the wheel loader 1 does not have to be performed in the driver's cab 3R provided in the wheel loader 1, and may be performed, for example, in a remote driver's cab (not illustrated) far away from the wheel loader 1. In this case, the operation device 30, the alarm device 51, and the display device 52 may be installed in the remote driver's cab.

Note that, in the above-described embodiment, the work vehicle 1 is not limited to the wheel loader 1. The work vehicle 1 may be, for example, at least one of a forklift, a dump truck, or a motor grader.

REFERENCE SIGNS LIST

1 WHEEL LOADER (WORK VEHICLE)
2 VEHICLE BODY
2F VEHICLE BODY FRONT PART
2R VEHICLE BODY REAR PART
3 DRIVER'S STAND
3R DRIVER'S CAB
4 TRAVELING DEVICE
4A ENGINE
4B BRAKE
4C STEERING CYLINDER
5 WHEEL
5F FRONT WHEEL
5R REAR WHEEL
6 TIRE
6F FRONT TIRE
6R REAR TIRE
7 TRANSMISSION
8 PARKING BRAKE
9 JOINT MECHANISM
10 WORKING EQUIPMENT
11 BOOM
12 BUCKET
12B DISTAL END PORTION
13 BELL CRANK
14 LINK
15 BOOM CYLINDER
16 BUCKET CYLINDER
20 OBJECT DETECTION DEVICE
21 CAMERA
21A CAMERA
21B CAMERA
21C CAMERA
21D CAMERA
21E CAMERA
21F CAMERA
22 NON-CONTACT SENSOR
22A NON-CONTACT SENSOR
22B NON-CONTACT SENSOR
22C NON-CONTACT SENSOR
22D NON-CONTACT SENSOR
30 OPERATION DEVICE
31 TRAVELING OPERATION DEVICE
32 TRANSMISSION OPERATION DEVICE
33 PARKING BRAKE OPERATION DEVICE
34 WORKING EQUIPMENT OPERATION DEVICE
40 SENSOR
41 SPEED SENSOR
42 POSTURE SENSOR
43 ANGLE SENSOR
44 WEIGHT SENSOR
50 MONITOR DEVICE
51 ALARM DEVICE
52 DISPLAY DEVICE
52A FIRST REGION
52B SECOND REGION
54 MARK
55 INDICATOR
56 ICON
60 VEHICLE CONTROL DEVICE
61 TRAVELING CONTROL UNIT
62 TRANSMISSION CONTROL UNIT
63 PARKING BRAKE CONTROL UNIT
64 WORKING EQUIPMENT CONTROL UNIT
70 MONITORING CONTROL DEVICE
71 OPERATION DATA ACQUISITION UNIT

72 STATE DATA ACQUISITION UNIT
73 PERIPHERY DATA ACQUISITION UNIT
74 DETECTION RANGE SETTING UNIT
75 ALARM RANGE SPECIFYING UNIT
76 WORK MODE DETERMINATION UNIT
77 ALARM RANGE CHANGING UNIT
78 OBSTACLE DETERMINATION UNIT
79 ALARM CONTROL UNIT
80 DISPLAY CONTROL UNIT
81 ALARM RANGE STORAGE UNIT
100 PERIPHERY MONITORING SYSTEM
1000 COMPUTER SYSTEM
1001 PROCESSOR
1002 MAIN MEMORY
1003 STORAGE
1004 INTERFACE
BI BIRD'S EYE IMAGE
CG CHARACTER IMAGE
D DETECTION REGION
DA DETECTION REGION
DB DETECTION REGION
DC DETECTION REGION
DD DETECTION REGION
F1 FIRST FORWARD MOVEMENT WORK
F2 SECOND FORWARD MOVEMENT WORK
FX ROTATION AXIS
L0 DIMENSION
L1 DIMENSION
La LINE
Lb LINE
Lc LINE
Lf LINE
Lg LINE
Lh LINE
LG LINE
R1 FIRST REARWARD MOVEMENT WORK
R2 SECOND REARWARD MOVEMENT WORK
RS GROUND SURFACE
RX ROTATION AXIS
SA SHOOTING REGION
SB SHOOTING REGION
SC SHOOTING REGION
SD SHOOTING REGION
SE SHOOTING REGION
SF SHOOTING REGION
SBp SHOOTING REGION
SCp SHOOTING REGION
SDp SHOOTING REGION
SEp SHOOTING REGION
SFp SHOOTING REGION
TA ALARM RANGE
TA0 INITIAL ALARM RANGE
TA1 CHANGED ALARM RANGE
TD DETECTION RANGE
W0 DIMENSION
W1 DIMENSION

The invention claimed is:

1. A work vehicle periphery monitoring system comprising:
an alarm range specifying unit that sets an alarm range, in which an alarm output is required when an object is present, in a detection range of an object detection device that detects an object present in a periphery of a work vehicle; and
an alarm range changing unit that changes the alarm range on a basis of operation data of a traveling operation device in a case where a steering device is operated while the work vehicle moves rearward, the alarm range being an alarm range defined behind a predetermined portion of the work vehicle.

2. The work vehicle periphery monitoring system according to claim 1, wherein
the alarm range changing unit decreases, in a state where the work vehicle swings to right, a length of an alarm region in a width direction on a left side of a center of the work vehicle in a vehicle width direction, and decreases, in a state where the work vehicle swings to left, a length of an alarm region in a width direction on a right side of the center of the work vehicle in the vehicle width direction.

3. The work vehicle periphery monitoring system according to claim 1, wherein
the alarm range changing unit changes the alarm range so that a dimension in a vehicle width direction of the work vehicle decreases.

* * * * *